United States Patent
Williams et al.

(10) Patent No.: US 11,333,071 B2
(45) Date of Patent: May 17, 2022

(54) DIVIDED VOLUTE TURBOCHARGER HAVING VANE RING WITH PLURALITY OF VANES HAVING ASYMMETRIC VANE PATTERN AND SYSTEM INCLUDING THE SAME

(71) Applicant: BorgWarner Inc., Auburn Hills, MI (US)

(72) Inventors: Greg Williams, Arden, NC (US); Drew Yoder, Hendersonville, NC (US); Michael Eugene Harris, Fairview, NC (US); Paul Troxler, Asheville, NC (US); Abhishek Biswas, Asheville, NC (US); Craig Andrew Colont, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/080,064

(22) Filed: Oct. 26, 2020

(65) Prior Publication Data

US 2021/0140366 A1 May 13, 2021

Related U.S. Application Data

(60) Provisional application No. 62/934,986, filed on Nov. 13, 2019.

(51) Int. Cl.
*F02C 6/12* (2006.01)
*F01D 17/14* (2006.01)
*F01D 17/16* (2006.01)

(52) U.S. Cl.
CPC .............. *F02C 6/12* (2013.01); *F01D 17/143* (2013.01); *F01D 17/165* (2013.01);
(Continued)

(58) Field of Classification Search
CPC ........ F01D 17/143; F01D 17/165; F01D 7/00; F02C 6/12; F05D 2220/40; F05D 2240/12;
(Continued)

(56) References Cited

U.S. PATENT DOCUMENTS

| 7,886,536 | B2 | 2/2011 | Hemer |
| 9,016,060 | B2 * | 4/2015 | Sauerstein ............ F01D 17/165 60/602 |

(Continued)

FOREIGN PATENT DOCUMENTS

WO 14140598 A1 9/2014

*Primary Examiner* — Jesse S Bogue
(74) *Attorney, Agent, or Firm* — Howard & Howard Attorneys PLLC

(57) ABSTRACT

A system includes a divided volute turbocharger that delivers compressed air to an internal combustion engine and receives exhaust gas from the internal combustion engine. The turbocharger includes a turbine housing, a first and second volute, and a turbine housing outlet. The system also includes turbine wheel disposed in the turbine housing and a vane ring disposed in the turbine housing between the turbine wheel and the volutes. The vane ring includes a plurality of vanes having an asymmetric vane pattern disposed on a vane ring surface of an annular disk that receives the turbine wheel therewithin to direct and control the flow of exhaust from the volutes into the turbine wheel with generally equal flow while significantly reducing HCF forcing function.

23 Claims, 11 Drawing Sheets

(52) U.S. Cl.
CPC ...... *F05D 2220/40* (2013.01); *F05D 2240/12* (2013.01); *F05D 2250/411* (2013.01); *F05D 2250/51* (2013.01); *F05D 2250/52* (2013.01)

(58) Field of Classification Search
CPC ........... F05D 2250/411; F05D 2250/51; F05D 2250/52; F02B 27/06; F02B 37/025; F02M 26/05
See application file for complete search history.

(56) References Cited

U.S. PATENT DOCUMENTS

| | | | |
|---|---|---|---|
| 9,845,770 B2 * | 12/2017 | Martinez-Botas | ...... F02B 33/40 |
| 10,227,889 B2 * | 3/2019 | Arnold | ................... F02B 37/025 |
| 2018/0266268 A1 * | 9/2018 | Karstadt | .................... F02C 6/12 |
| 2021/0207489 A1 * | 7/2021 | Avola | .................... F01D 17/165 |

* cited by examiner

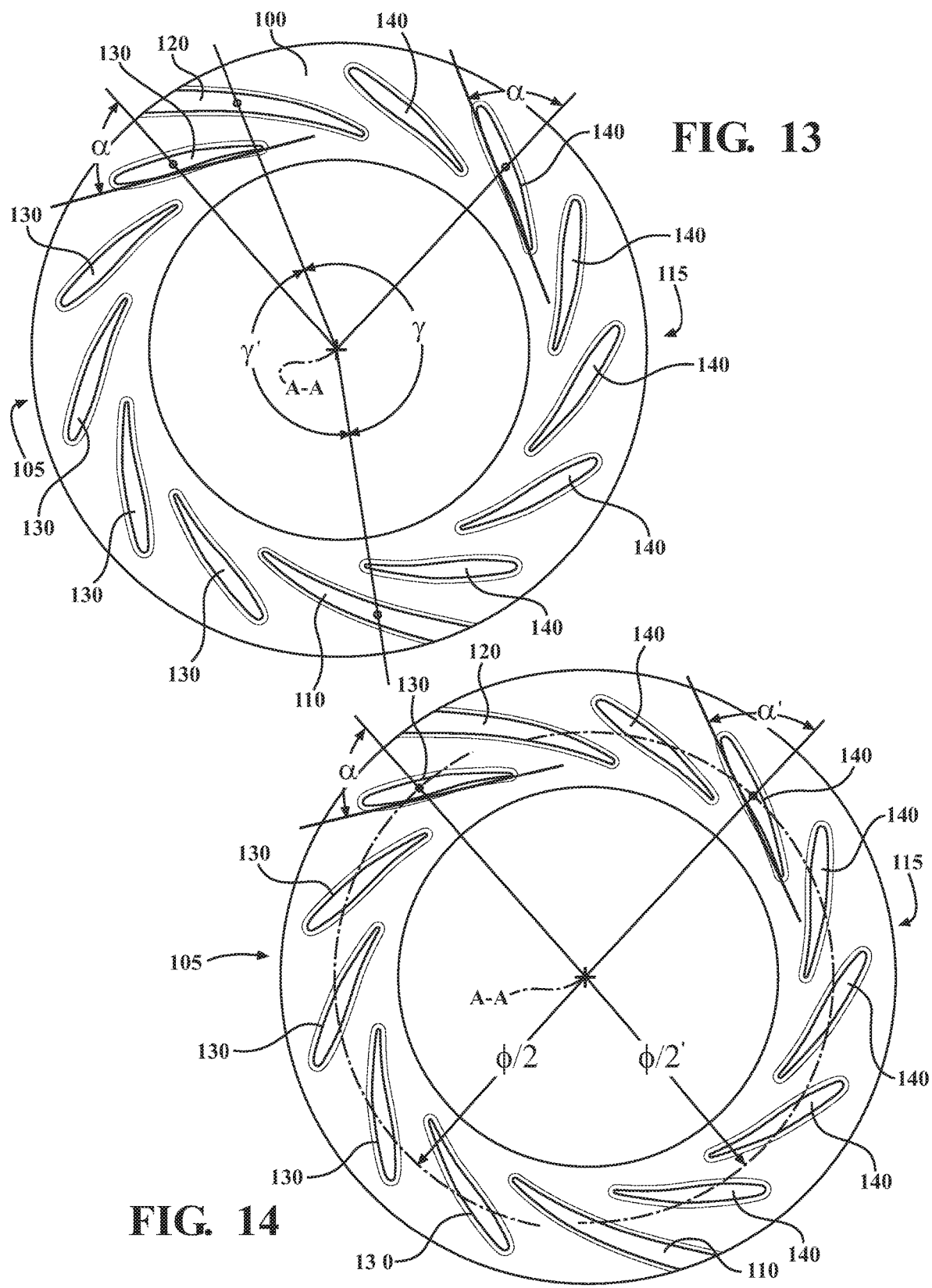

DIVIDED VOLUTE TURBOCHARGER HAVING VANE RING WITH PLURALITY OF VANES HAVING ASYMMETRIC VANE PATTERN AND SYSTEM INCLUDING THE SAME

CROSS-REFERENCE TO RELATED APPLICATIONS

This application claims the benefit of U.S. Provisional Application No. 62/934,986 filed Nov. 13, 2019, the disclosure of which is herein incorporated by reference in its entirety.

1. FIELD OF THE INVENTION

This invention relates generally to a system including a divided volute turbocharger and including a vane ring having a plurality of vanes having an asymmetric vane pattern, with the asymmetric vane pattern providing the turbocharger with generally equalized flow symmetry and decreased high cycle fatigue.

2. DESCRIPTION OF THE RELATED ART

Turbochargers receive exhaust gas from an internal combustion engine and deliver compressed air to the internal combustion engine. Turbochargers increase the power output of the internal combustion engine, lower fuel consumption of the internal combustion engine, and/or reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use in a vehicle reduces the mass and aerodynamic frontal area of the vehicle, which helps reduce fuel consumption of the internal combustion engine and improve fuel economy of the vehicle.

Some turbochargers include a turbine having a divided volute turbine housing, with the turbochargers therefore sometimes alternatively referred to as a divided volute turbocharger (or, when two volutes are utilized, a dual volute turbocharger). The volutes of a divided volute turbine housing are completely isolated from one another such that no mixing of exhaust gas occurs until after the exhaust gas passes the tongues of the respective volutes. The divided volute turbine housing includes a turbine inlet, a turbine outlet, and an interior volume. The turbine inlet is configured for attachment to an internal combustion engine (e.g., to an exhaust manifold or to a cylinder head of an internal combustion engine) and includes a plurality of inlet ports configured to be in fluid communication with exhaust paths of the internal combustion engine upon attachment. The interior volume of the turbine housing defines at least two divided volutes in fluid communication with the respective inlet ports for delivering exhaust gas from the internal combustion engine to a turbine wheel disposed in the interior volume. After energy is extracted from the exhaust gas by the turbine wheel, the exhaust gas exits the turbine housing via the turbine outlet. The volutes guide the exhaust gas from the exhaust manifold of the engine into an arcuate flow for distribution of exhaust around the circumference of the turbine wheel to rotate the turbine wheel.

Turbocharges also include a compressor. The compressor includes a compressor wheel coupled to the turbine wheel via a shaft. The compressor is powered by the rotation of the turbine wheel, which in turn drives a compressor wheel within a compressor housing of the compressor.

In multi-cylinder engines, cylinders fire in a sequential order. For example, in an inline four-cylinder engine in which the cylinders are sequentially numbered 1 through 4, the firing order may be 1-3-4-2. A collection of cylinders may be grouped into a 'bank'. In the above example, a first bank of cylinders would include cylinders 1 and 4 and a second bank of cylinders would include cylinders 2 and 3. In the case of a "V" engine, the banks of cylinders can be separated across the engine, and multiple cylinders may be firing at the same time. In the case of an inline engine, the banks of cylinders could simply be the front cylinders versus the back cylinders, or an alternate collection of cylinders as described above. Exhaust gas flow is not a smooth stream because exhaust gases exit each cylinder based on the engine's firing sequence, resulting in intermittent exhaust gas pulses. The exhaust gas from each bank is conducted to the turbine housing in respective manifolds. The manifolds may be pipes and/or ducts attached to the internal combustion engine or may be integral to the internal combustion engine (e.g., manifold ducts cast into a cylinder head of the engine). By separating the exhaust gas streams, the "pulses" of pressure that occurs when the exhaust gas is released from the cylinder may be preserved through the volutes such that the pressure pulses impinge on the turbine wheel. The preservation of the pulses is typically desirable because the pressure pulse imparts momentum to the turbine wheel, thereby accelerating the turbine wheel faster and reducing turbo lag. Moreover, the pressure pulse increases the instantaneous turbine power extraction from the "fired" volute while reducing instantaneous backpressure in the "non fired" volute. The term "fired" volute refers to the volute with the pressure pulse passing through it. This separation of pulse begins at the exhaust of each cylinder and is maintained in the exhaust manifold up to the turbine inlet. In the region where the exhaust gases are admitted to the turbine housing, a separator wall between the respective volutes can help preserve the separation between exhaust gases from each cylinder or cylinder group, and thus maintain the pressure pulses.

To aid in directing and controlling the exhaust flow from the volute or divided volutes to the turbine wheel uniformly, a vane ring (sometimes alternatively referred to as a nozzle ring or vaned nozzle stator) with a plurality of vanes can be disposed in the turbine housing interior between the volutes and turbine wheel. Typically, the vanes on the vane ring are equally spaced relative to each other and are each positioned at the same radial distance relative to the axis of rotation of the turbine wheel. Still further, such vanes are typically equally angled relative to a radial line drawn from the axis of rotation. Typically, the number of vanes disposed on the vane ring is an odd number, which therein provides a degree of asymmetry along the vane ring associated with the odd number of equally spaced vanes.

As such, there remains a need to optimize the pattern (i.e., relative positioning or configuration) of vanes on the vane ring for use in turbochargers, and in particular for use in divided volute turbochargers, that provide generally equalized flow symmetry in each volute emission while decreasing high cycle fatigue (HCF) forcing function.

SUMMARY OF THE INVENTION AND ADVANTAGES

A system includes a divided volute turbocharger that receives exhaust gas from the internal combustion engine and delivers compressed air to an internal combustion engine. The internal combustion engine includes a first group of cylinders and a second group of cylinders, with the relative pulse of exhaust gas delivered from the first and second group of cylinders being generally equal for each exhaust stroke. The turbocharger includes a turbine housing interior adapted to receive a turbine wheel having a plurality of equally spaced turbine blades. The turbocharger also includes a first volute adapted for fluid communication with the internal combustion engine and the turbine housing interior for delivering exhaust gas from the first group of cylinders to the turbine housing interior, a second volute adapted for fluid communication with the internal combustion engine and the turbine housing interior for delivering exhaust gas from the second group of cylinders to the turbine housing interior independently of the first volute, a turbine housing outlet in fluid communication with the turbine housing interior, and a wall separating the first volute from the second volute and including a first tongue and a second tongue spaced from the first tongue.

The system also includes a vane ring disposed in the turbine housing interior between the first and second volutes and around the turbine wheel. The vane ring includes an annular disk including a vane ring surface disposed between an inner circumferential ring and an outer circumferential ring with the inner circumferential ring defining an orifice for receiving the turbine wheel, with the vane ring surface including a plurality of vanes having an asymmetric vane pattern. The plurality of vanes include a first tongue vane having a leading edge extending along the vane ring surface to the outer circumferential ring and aligned with the first tongue, a second tongue vane spaced around the vane ring relative to the first tongue vane, with the second tongue vane having a leading edge extending along the vane ring surface to the outer circumferential ring and aligned with the second tongue, and with the first and second tongue vanes dividing the vane ring surface into a first arcuate region and a second arcuate region. The plurality of vanes also include a first set of vanes disposed in a spaced apart manner along the first arcuate region of the vane ring surface and positioned downstream from the first volute and a second set of vanes disposed in a spaced apart manner along the second arcuate region of the vane ring surface and positioned downstream from the second volute, with the second set of vanes disposed differently than the first set of vanes to define the asymmetric vane pattern.

The vane ring includes wherein one or more of the vane angle ($\alpha$), vane spacing ($\beta$), and the vane orientation radius ($\phi/2$) of the plurality of vanes disposed on the vane ring surface are varied to direct and control the flow of exhaust from the volutes into the turbine wheel with generally equal flow while significantly reducing HCF forcing function.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 13 is an end view of the vane ring of FIGS. 2 and 12 illustrating the asymmetric vane pattern of the vanes with equal vane spacing, equal vane orientation radii ($\phi/2$), equal vane angles ($\alpha$), and unequal tongue clocking of the respective pair of tongue vanes with volute separation at the tongue vanes;

FIG. 14 is an end view of a vane ring having an alternative asymmetric vane pattern for use in the turbocharger of the system of FIGS. 1-7 in accordance with an embodiment of the present invention illustrating an asymmetric vane pattern with equal vane spacing ($\beta$), unequal vane orientation radii ($\phi/2$), unequal vane angles ($\alpha$), and unequal tongue clocking angles ($\gamma$) and ($\gamma'$) of the respective pair of tongue vanes with volute separation at the tongue vanes.

DETAILED DESCRIPTION OF THE INVENTION

Figure 1:
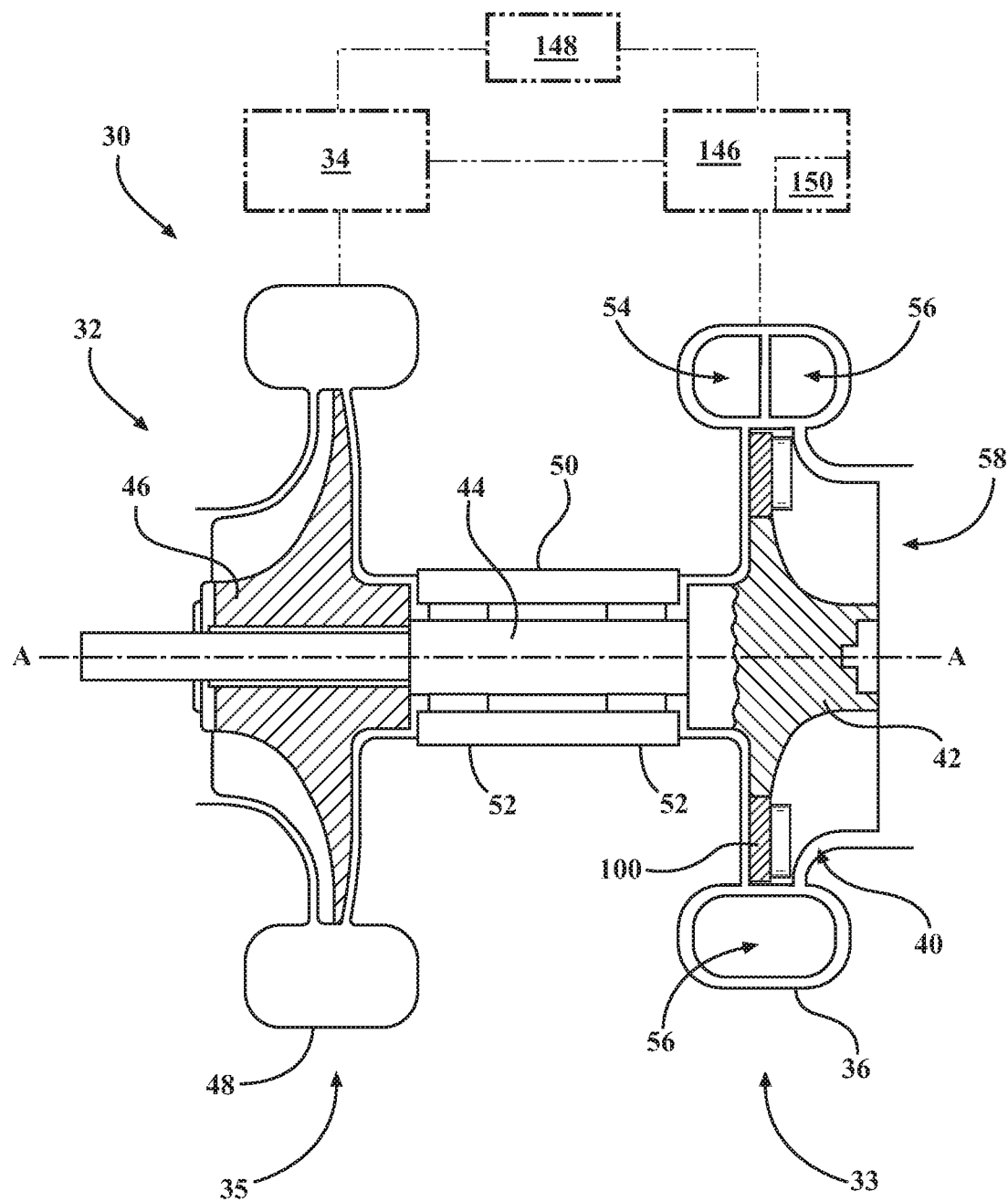
FIG. 1 is a schematic representation of a system including a turbocharger having a dual volute turbine housing, turbine wheel disposed in the turbine housing, and a vane ring disposed in the turbine housing between the dual volute turbine housing and the turbine wheel.

With reference to the Figures, wherein like numerals indicate like parts throughout the several views, a schematic representation of a system 30 (i.e., an entryway system 30) is shown in FIG. 1. The system 30 includes a turbocharger 32 having a turbine portion 33 for receiving exhaust gas from an internal combustion engine 34 and a compressor portion 35 for delivering compressed air to the internal combustion engine 34. Although not required, the turbocharger 32 is typically used in passenger and commercial automotive applications. However, it is to be appreciated that the turbocharger 32 may be used in non-automotive applications such as heavy equipment applications, non-automotive diesel engine applications, non-automotive motor applications, and the like.

The turbine portion 33 includes a turbine housing 36 having an interior surface 38 defining the turbine housing interior 40. The turbine housing interior 40 is adapted to receive the turbine wheel 42 having a plurality of turbine blades 45 (see FIG. 2), here a plurality of evenly spaced turbine blades 45. In addition, the turbocharger 32 typically includes a turbocharger shaft 44, a compressor wheel 46, a compressor housing 48, and a bearing housing 50. During operation of the turbocharger 32, the turbine wheel 42 (and in particular the turbine blades 45 of the turbine wheel 42) receives exhaust gas from the internal combustion engine 34 which causes the turbine wheel 42 to rotate. When present, the turbocharger shaft 44 is coupled to and rotatable by the turbine wheel 42. When present, the compressor wheel 46 is disposed in the compressor housing 48, is coupled to the turbocharger shaft 44, and is rotatable by the turbocharger shaft 44 for delivering compressed air to the internal combustion engine 34. The bearing housing 50 extends about the turbocharger shaft 44 between the turbine wheel 42 and the compressor wheel 46. The turbocharger 32 also typically includes bearings 52 disposed about the turbocharger shaft 44 and in the bearing housing 50 for rotatably supporting the turbocharger shaft 44.

The interior surface 38 of the turbine housing 36 defines a plurality of volutes separated by walls, and hence the turbine housing 36 is defined as a divided volute turbine housing. In one exemplary embodiment, as shown in FIGS. 2-7, the divided volute turbine housing 36 is a dual volute turbine housing 36, and hence the interior surface 38 defines a first volute 54 and a second volute 56 that are respectfully separated by a wall 60. For ease of description herein after, the turbocharger 32 will be further explained as including a dual volute turbine housing 36. However, embodiments of turbine housings having additional numbers of volutes (e.g., three volutes or four volutes) are within the scope described herein.

The first and second volutes 54, 56 are each in fluid communication with the internal combustion engine 34 and the turbine housing interior 40 for delivering exhaust gas from the internal combustion engine 34 to the turbine housing interior 40. As also shown in FIGS. 1 and 3-7, the interior surface 38 also defines a turbine housing outlet 58. The turbine housing outlet 58 is in fluid communication with the turbine housing interior 40 for discharging exhaust gas from the turbine housing interior 40. In addition, the inner surface 38 also defines a wastegate 71 fluidically coupling each of the first and second volutes 54, 56 to the turbine housing outlet 58. The turbine housing 36 may be comprised of any suitable metal. Typically, the turbine housing 36 is comprised of iron or a steel alloy.

Figure 2:
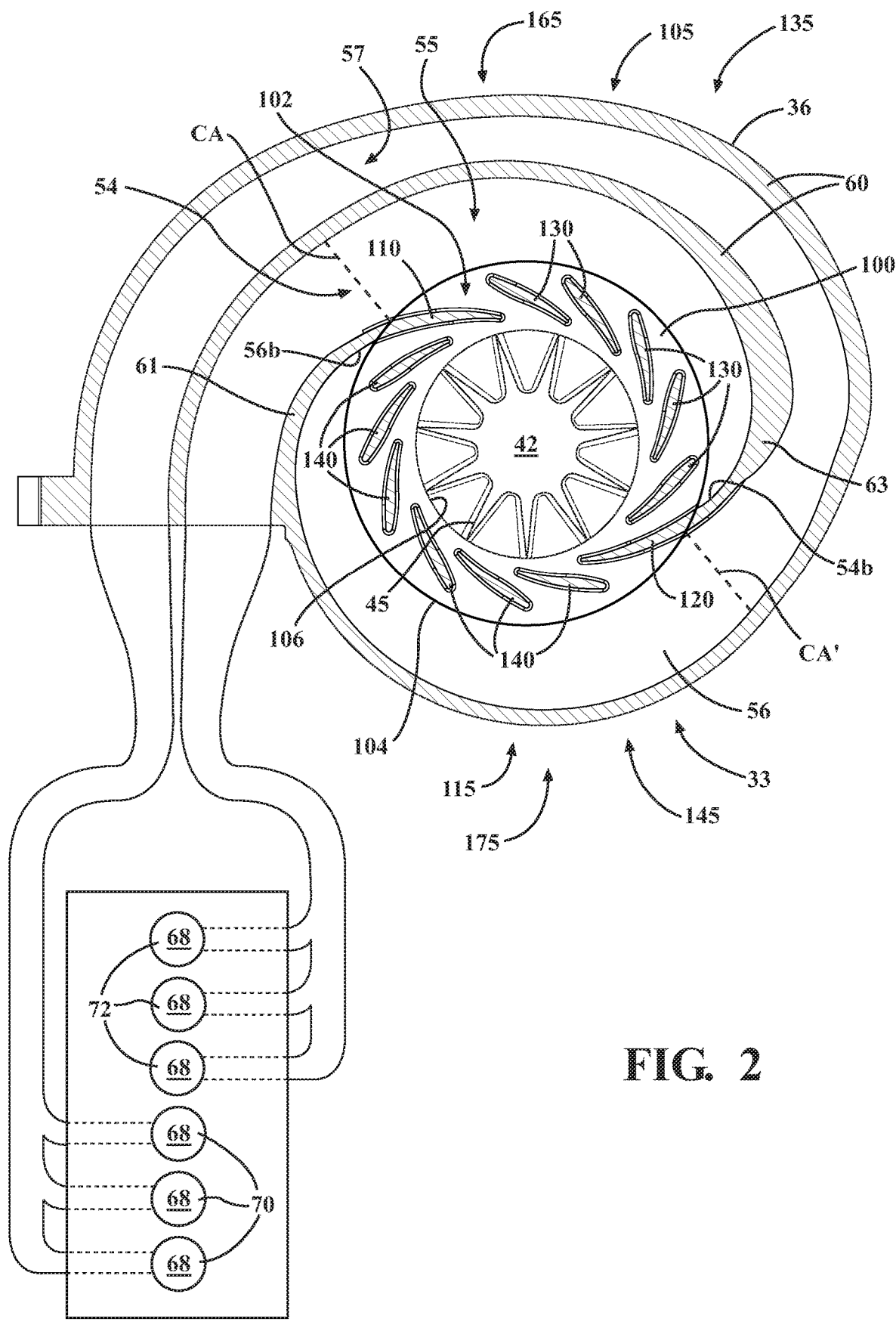
FIG. 2 is a schematic representation of an internal combustion engine and a cross-sectional end view of the dual volute turbine housing and vane ring of FIG. 1 adapted for fluid communication with an internal combustion engine.
Figure 3:
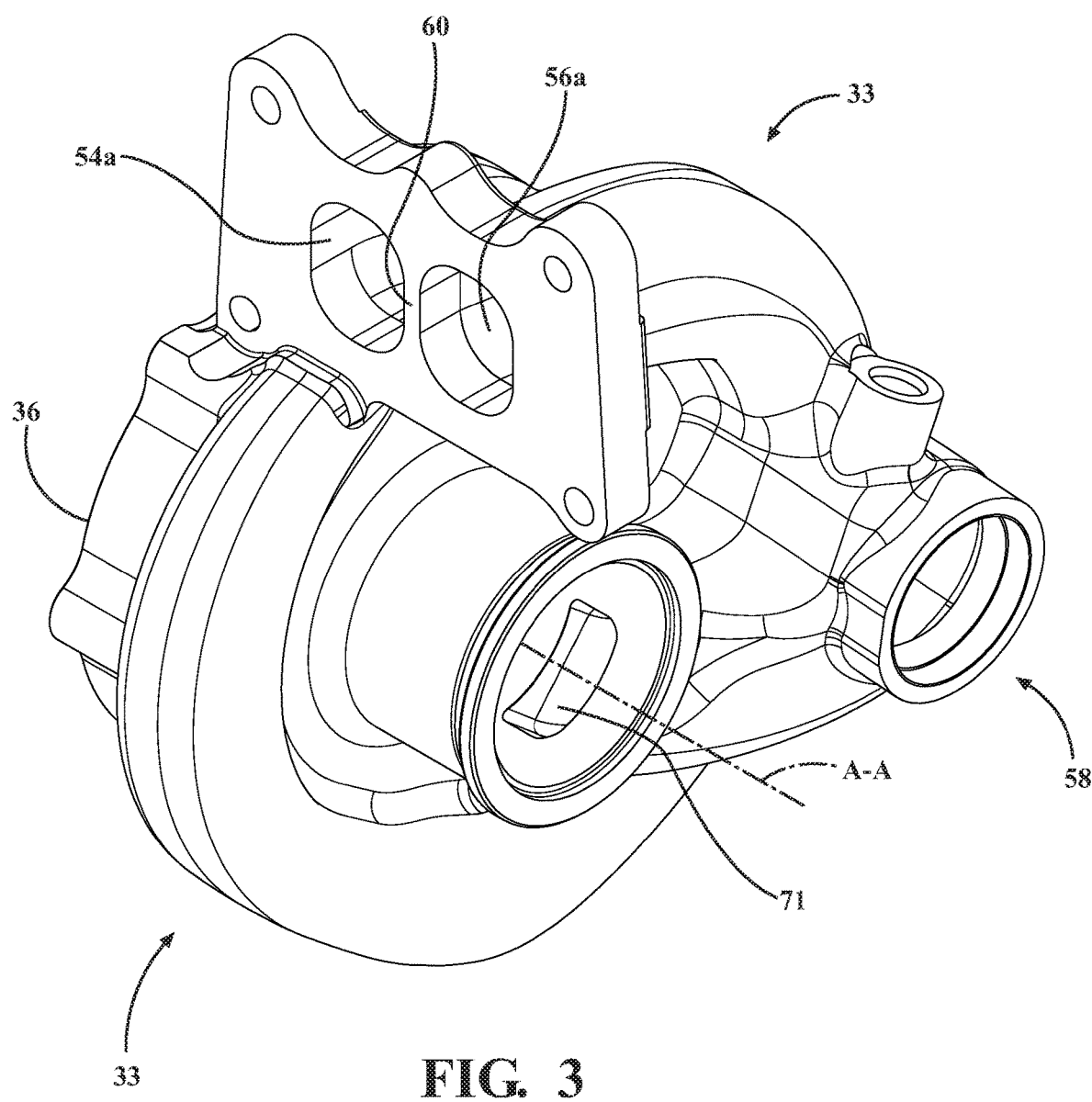
FIG. 3 is a side perspective view of the turbine portion of the turbocharger of FIGS. 1 and 2 without the turbine wheel and turbocharger shaft.
Figure 4:
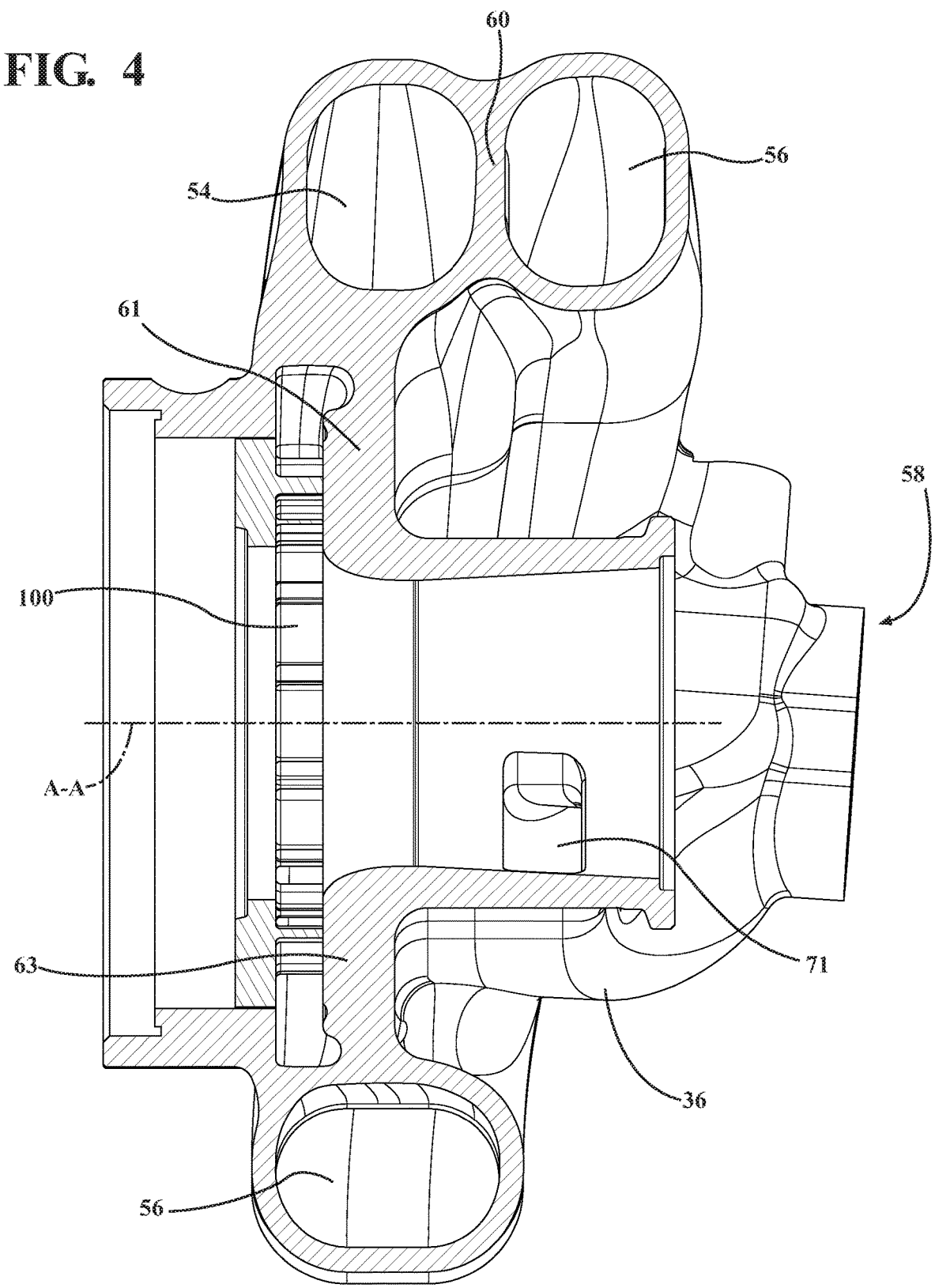
FIG. 4 is a side section view of FIG. 3.
Figure 5:
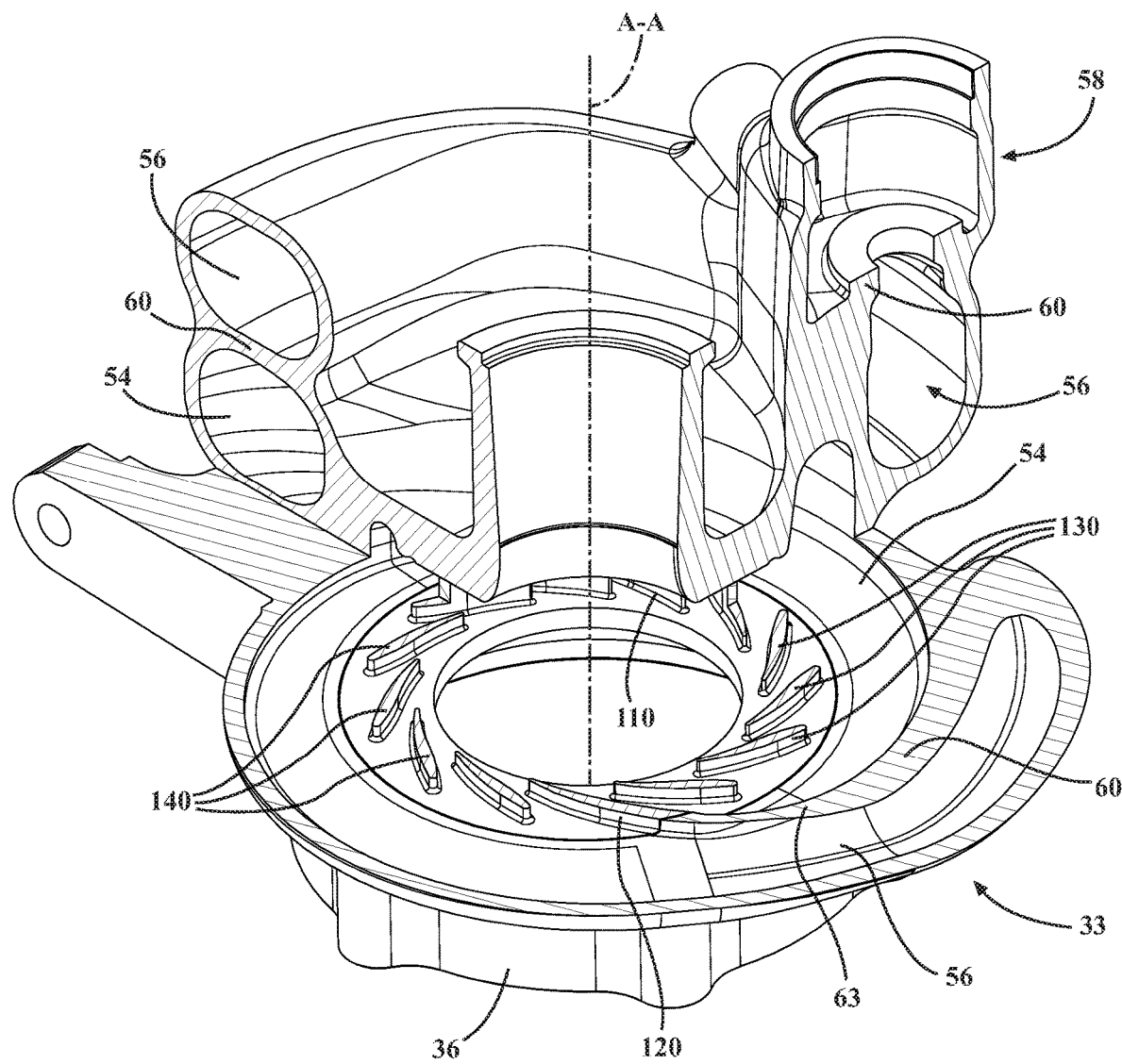
FIG. 5 is a partial section view of FIG. 3.
Figure 6:
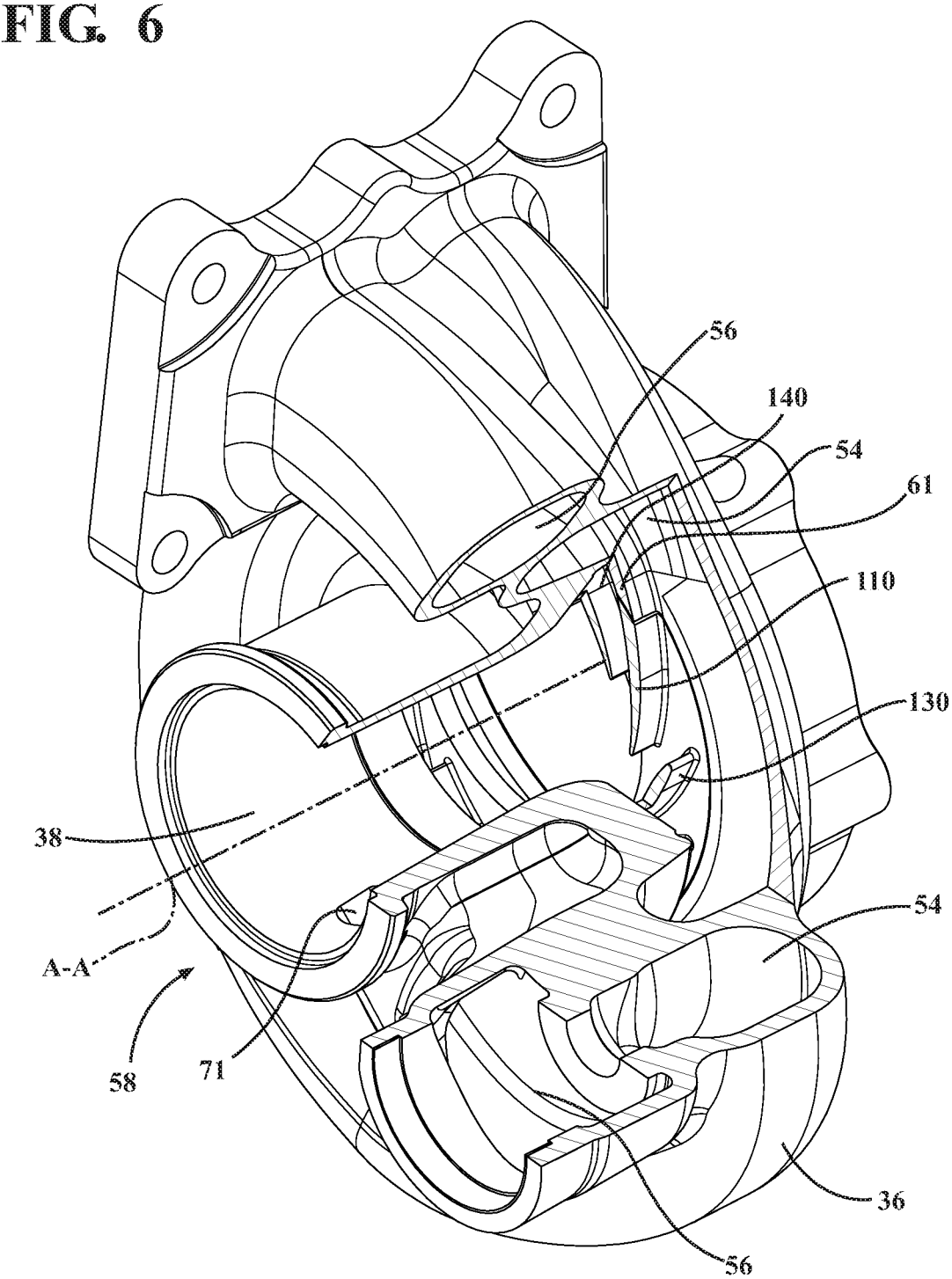
FIG. 6 is another partial section view of FIG. 3.
Figure 7:
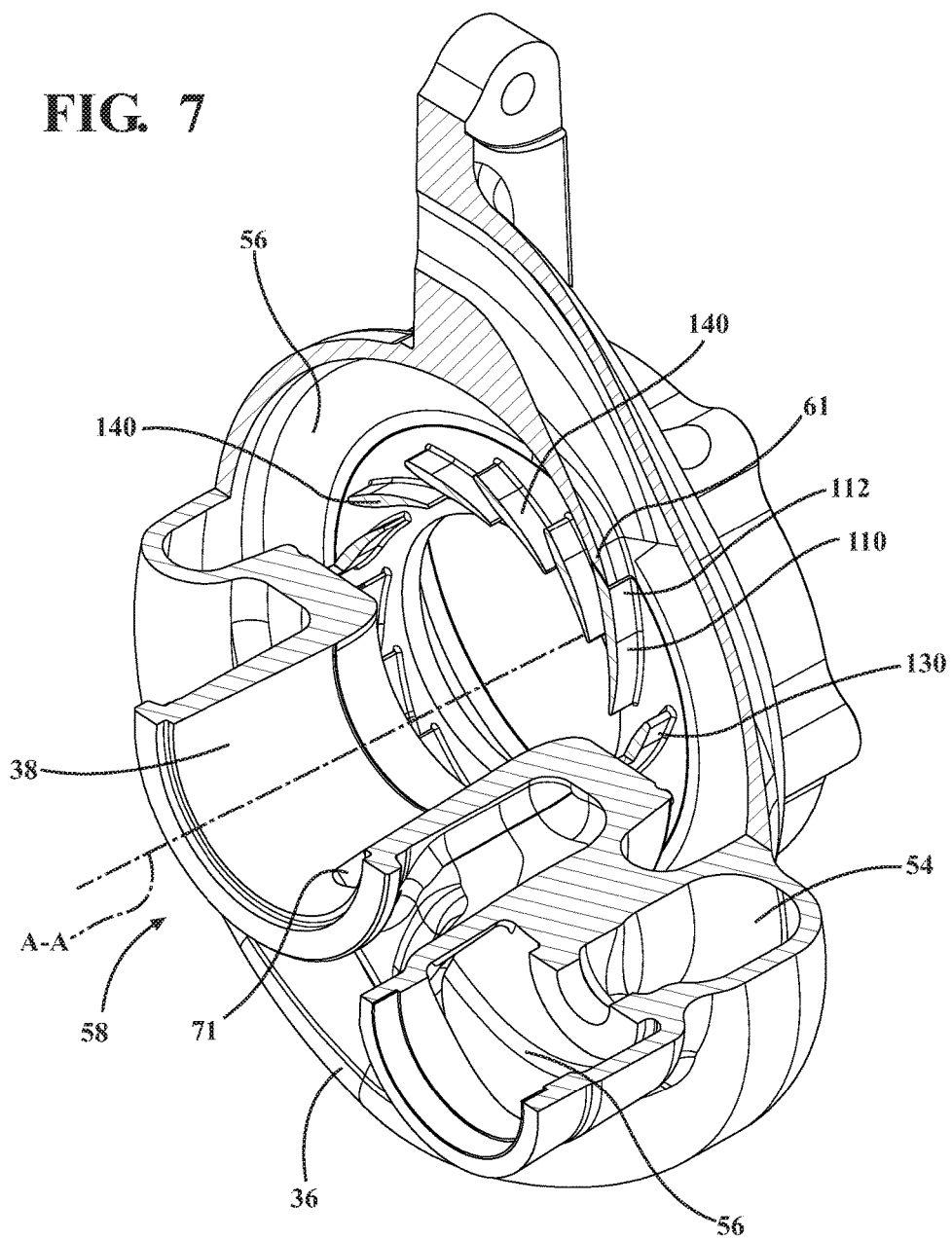
FIG. 7 is yet another partial section view of FIG. 3.

With reference again to FIG. 2, the internal combustion engine 34 includes a plurality of cylinders 68. In the illustrated embodiment, the internal combustion engine 34 includes six cylinders 68. However, it is to be appreciated that the internal combustion engine 34 may include any number of cylinders 68. For example, the internal combustion engine 34 may include two cylinders 68, four cylinders 68, six cylinders 68, eight cylinders 68, or more cylinders 68. The internal combustion engine 34 may also include an odd number of cylinders (e.g., three cylinders 68 or five cylinders 68). The internal combustion engine 34 may have a V-engine configuration, a flat/boxer engine configuration, a W-engine configuration, an inline engine configuration, and the like. In the illustrated embodiment, the internal combustion engine 34 has an inline engine configuration. The internal combustion engine 34 includes a first group of cylinders 70 and a second group of cylinders 72. In the illustrated embodiment, the first and second groups of cylinders 70, 72 each include half of the cylinders 68 that are included in the internal combustion engine 34. For example, when the internal combustion engine 34 includes six cylinders 68 as shown in FIG. 2, the first group of cylinders 70 includes three of the cylinders 68 and the second group of cylinders 72 includes the other three of the cylinders 68. The first and second groups of cylinders 70, 72 produce exhaust gas in a series of pulses corresponding to an exhaust stroke of each of the first and second groups of cylinders 70, 72. Timing of the exhaust strokes of the cylinders 68 is such that pulses of exhaust gas are alternately emitted from the first group of cylinders 70 and the second group of cylinders 72. The area of the first volute 54, in combination with the produced gas from the exhaust stroke of the first group of cylinders 70, defines a first volute flow parameter 55. Similarly, the corresponding area of the second volute 56, in combination with the produced gas from the exhaust stroke of the second group of cylinders 72, defines a second volute flow parameter 57. Stated another way, the first volute 54 defines the first volute flow parameter 55 for the relative pulse of exhaust gas received from the first group of cylinders 70, while the second volute 56 defines the second volute flow parameter 57 for the relative pulse of exhaust gas received from the second group of cylinders 72. The volute flow parameter δ for a volute (such as the value of the first and second volute flow parameter 55, 57 of the respective first and second volute 54, 56 as provided herein) is calculated by the equation:

$$\delta = \frac{\dot{m}\sqrt{T}}{P}$$

wherein m is the mass flow through the volute, T is the exhaust gas temperature at the inlet of the volute, and P is the exhaust gas pressure at the inlet of the volute. Typically, the volute flow parameter δ is measured for each respective exhaust stroke of the respective one of the first and second group of cylinders 70, 72.

With continued reference to FIG. 2, typically the first group of cylinders 70 are in fluid communication with the first volute 54 and the second group of cylinders 72 are in communication with the second volute 56. In this manner, pulses of exhaust gas from the first and second groups of cylinders 70, 72 flow through the first and second volutes 54, 56, respectively, and to the turbine housing interior 40, where the pulses of exhaust gas rotate the turbine wheel 42. The respective pulses of exhaust gas flowing through the first volute 54 from the first group of cylinders 70 (typically measured for each exhaust stroke) and area of the first volute 54 define a first volute flow parameter 55, while the respective pulses of exhaust gas flowing through the second volute 56 from the second group of cylinders 72 (again typically measured for each exhaust stroke) and area of the second volute 56 define a second volute flow parameter 57. Owing to the difference in sizes of the areas of the first and second volutes 54, 56, the first and second volute flow parameters 55, 57 are generally different from one another, with the first volute flow parameter 55 as shown in FIG. 2 being larger than the second volute flow parameter 57 due to its longer runner length.

As also shown in FIG. 2, the entryway system 30 includes a vane ring 100 in the form of an annular disk disposed in the turbine housing interior 40 between the divided first and second volutes 54, 56 and the turbine wheel 42. The vane ring 100 includes a plurality of vanes (shown as 110, 120, 130, 140 in FIGS. 2-15) that function to control the flow of exhaust gas flowing from the one or more volutes 54, 56 to the turbine wheel 42.

Referring back to FIG. 2 and as also best shown in FIGS. 9-15, the vane ring 100 includes a vane ring surface 102 extending between an inner circumferential edge 104 and an outer circumferential edge 106. The inner circumferential edge 104 defines a circular orifice for receiving the turbine wheel 42 of the turbocharger 32. The vane ring surface 102 of the vane ring 100 includes a first tongue vane 110 and a second tongue vane 120 extending from the vane ring surface 102, with the second tongue vane 120 spaced around the vane ring 100 relative to the first tongue vane 110. The first and second tongue vanes 110, 120 divide the vane ring surface 102 into a first and second arcuate region 105, 115, respectively.

The vane ring surface 102 of the vane ring 100 also includes a first set of vanes 130 (i.e., a first set of at least two vanes 130) disposed in a spaced apart manner from one another on the vane ring surface 102 in the first arcuate region 105 between the first and second tongue vanes 110, 120 such that the first set of vanes 130 are positioned downstream of the first volute 54. Still further, the vane ring surface 102 of the vane ring 100 also includes a second set of vanes 140 disposed in a spaced apart manner from one another on the vane ring surface 102 in the second arcuate region 115 between the first and second tongue vanes 110, 120 such that the second set of vanes 140 (i.e., a second set of at least two vanes 140) are positioned downstream of the second volute 56. In the embodiment illustrated, the first set of vanes 130 includes five vanes 130 positioned adjacent to one another along the first arcuate region 105 of the vane ring surface 102 around the vane ring 100, while the second set of vanes 140 includes six vanes 140 positioned adjacent to one another along the first arcuate region 105 of the vane ring surface 102 around the vane ring 100. Accordingly, there are a total of thirteen vanes 110, 120, 130, 140 on the vane ring 102 in the embodiment of FIGS. 2-7, which provide exhaust flow to a turbine wheel 42 having a total of eleven equally spaced turbine blades 45. While the embodiments provided herein include thirteen vanes 110, 120, 130, 140 and eleven turbine blades 45, alternative amounts of vanes and blades are contemplated, preferably wherein the number of vanes 110, 120, 130, 140 is an odd number so as to maintain asymmetry on the vane ring 100.

The first tongue vane 110 (see also FIG. 8B) extends in length between a leading edge portion 112 and a trailing edge portion 114. The leading edge portion 112 extends along the vane ring surface 102 to the outer circumferential edge 106 and is positioned in alignment with a first tongue 61 of the wall 60 that divides a portion of the first and second volute 54, 56. Similarly, the second tongue vane 120 (see also FIG. 8B) extends in length between a leading edge portion 122 and a trailing edge portion 124. The leading edge portion 122 extends along the vane ring surface 102 to the outer circumferential edge 106 and is positioned in alignment with a second tongue 63 of the wall 60 that divides another portion of the first and second volutes 54, 56 (i.e., the first and second tongues 61, 63 are different portions of the wall 60 spaced from each other that separate the first and second volutes 54, 56). The first and second tongue vanes 110, 120 thus define an extension of the wall 60 separating the first and second volutes 54, 56 and have a different overall geometry than the corresponding vanes 130, 140 to accommodate this extension. For example, the leading edge portions 112, 122 are generally flat so as to align with the respective extensions of the wall 60 (i.e., the first and second tongues 61, 63).

Similar to the first and second tongue vanes 110, 120, each of the vanes 130 and 140 (see also FIG. 8A) extends in length between a leading edge portion 132, 142 and a trailing edge portion 134, 144. However, as opposed to the first and second tongue vanes 110, 120, neither the leading edge portions 132, 142 or the trailing edge portions 134, 144 extend to either the inner circumferential edge 104 or the outer circumferential edge 106. While FIGS. 12-15 illustrate the lengths of the vanes 130, 140 being different than the lengths of the first and second tongue vanes 110, 120, such views are schematic in nature in this regard. As a result, the lengths of the vanes 130, 140 may be the same (i.e., equal), less than, or greater than the lengths of the first and second tongue vanes 110, 120.

Accordingly, the area located between the first arcuate region 105 of vane ring surface 102 of the vane ring 100 and the interior surface 38 of the turbine housing 36 that is downstream of and adjacent to the first volute 54 defines a first vane flow parameter 135 (i.e., the area located between the first arcuate region 105 of vane ring surface 102 of the vane ring 100 and the interior surface 38 of the turbine housing 36 in combination with the relative pulse of the exhaust gas received from the first volute 54 during an exhaust stroke of the first group of cylinders 70 defines the first vane flow parameter), while the area located between the second arcuate region 115 of the vane ring surface 102 of the vane ring 100 and the interior surface 38 of the turbine housing 36 that is downstream of and adjacent to the second volute 56 defines a second vane flow parameter 145 (i.e., the area located between the second arcuate region 115 of vane ring surface 102 of the vane ring 100 and the interior surface 38 of the turbine housing 36 in combination with the relative pulse of the exhaust gas received from the first volute 54 during an exhaust stroke of the first group of cylinders 70 defines the second vane flow parameter 145). Stated another way, the first set of vanes 130 defines the first vane flow parameter 135 in an area located between the first arcuate region 105 and the interior surface 38 of the turbine housing 36 downstream of the first volute 54 for receiving the relative pulse of exhaust gas from the first volute 54 corresponding to an exhaust stroke of the first group of cylinders 70, while the second set of vanes 140 defines the second vane flow parameter 145 in an area located between the second arcuate region 115 and the interior surface 38 of the turbine housing 38 downstream of the second volute 56 for receiving the relative pulse of exhaust gas from the second volute 56 corresponding to an exhaust stroke of the second group of cylinders 72. Still further, the first vane flow parameter 135 in series combination with the first volute flow parameter 55 define a first total flow parameter 165, while the second vane flow parameter 145 in series combination with the second volute flow parameter 57 define a second total flow parameter 175.

In embodiments disclosed herein, the patterns (i.e., the relative position or configurations) of the first and second tongue vanes 110, 120 and the first and second sets of vanes 130, 140 can be set such that exhaust gas flow impinging on the turbine wheel 42 through the first arcuate region 105 is different than the exhaust gas flow impinging on the turbine wheel 42 through the second arcuate region 115. Additionally, the embodiments disclosed herein may include further differences in gas flow impingement circumferentially within the arcuate regions 105 and 115. The different exhaust gas flow impingement characteristics through (and within) the first and second arcuate regions 105, 115 may reduce aerodynamic excitation effects on the turbine wheel 42 that can result in high cycle fatigue failure of a turbine wheel 42. Moreover, the patterns of the first and second tongue vanes 110, 120 and the first and second sets of vanes 130, 140 can be set to achieve desired first and second total flow parameters 165, 175.

Figure 8A:
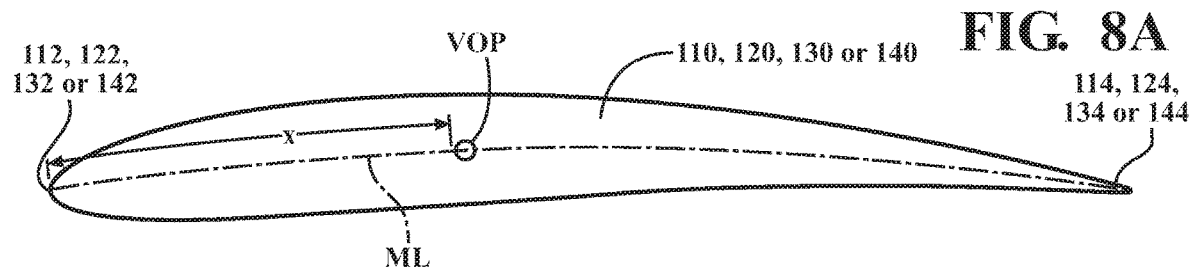
FIG. 8A is an end view of a vane of a vane ring, illustrating the vane orientation point of the vane.
Figure 8B:
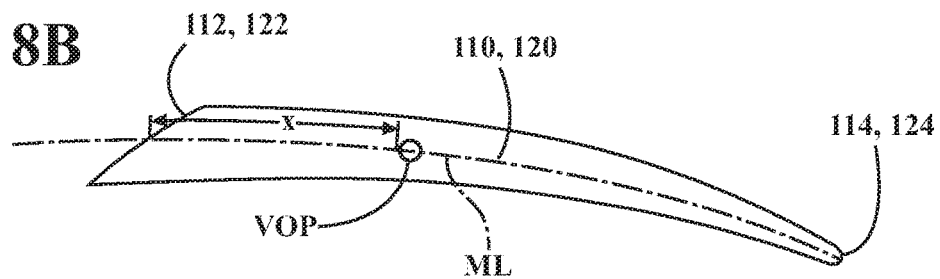
FIG. 8B is an end view of a tongue vane of a vane ring, illustrating the vane orientation point of the tongue vane.
Figure 9:
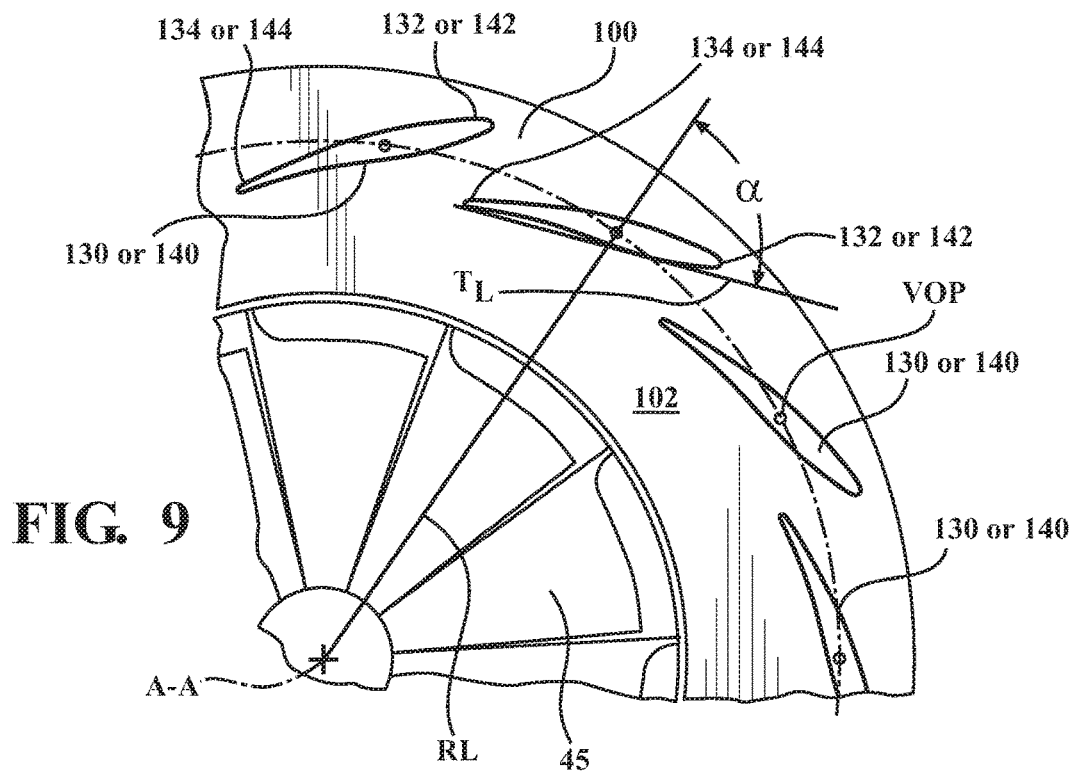
FIG. 9 is an end view of the turbine wheel and vane ring of FIG. 8 illustrating the vane angle ($\alpha$) of one of the vanes contained on the vane ring.
Figure 10:
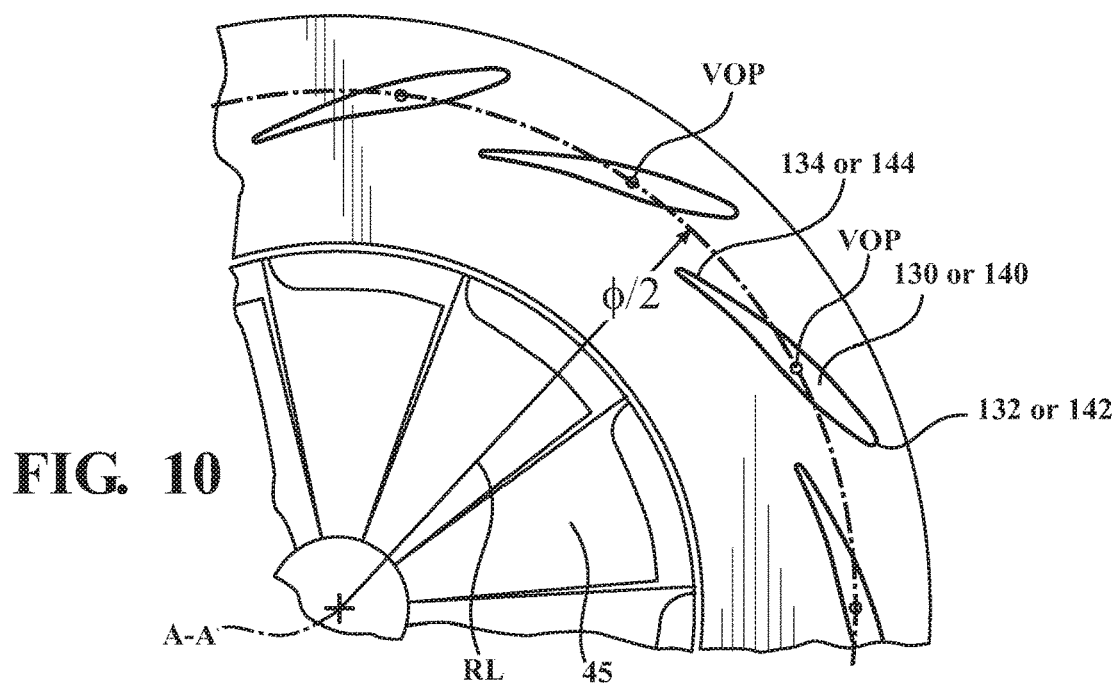
FIG. 10 is an end view of the turbine wheel and vane ring of FIG. 8 illustrating the vane orientation radius ($\phi/2$) of a plurality of the vanes contained on the vane ring.
Figure 11:
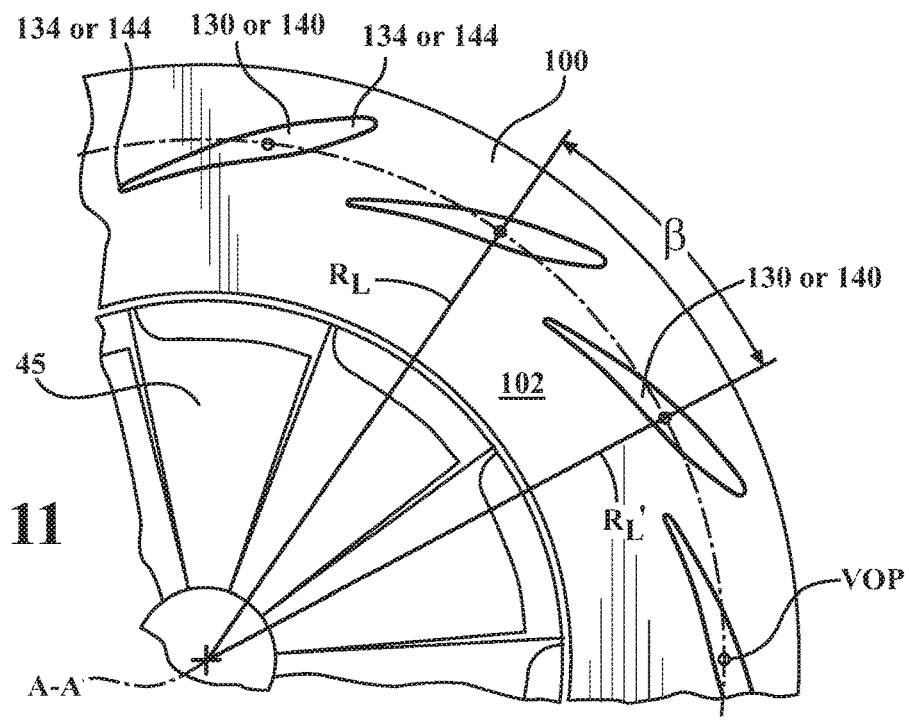
FIG. 11 is an end view of the turbine wheel and vane ring of FIG. 8 illustrating the vane spacing ($\beta$) of a respective adjacent pair of the vanes contained on the vane ring.
Figure 12:
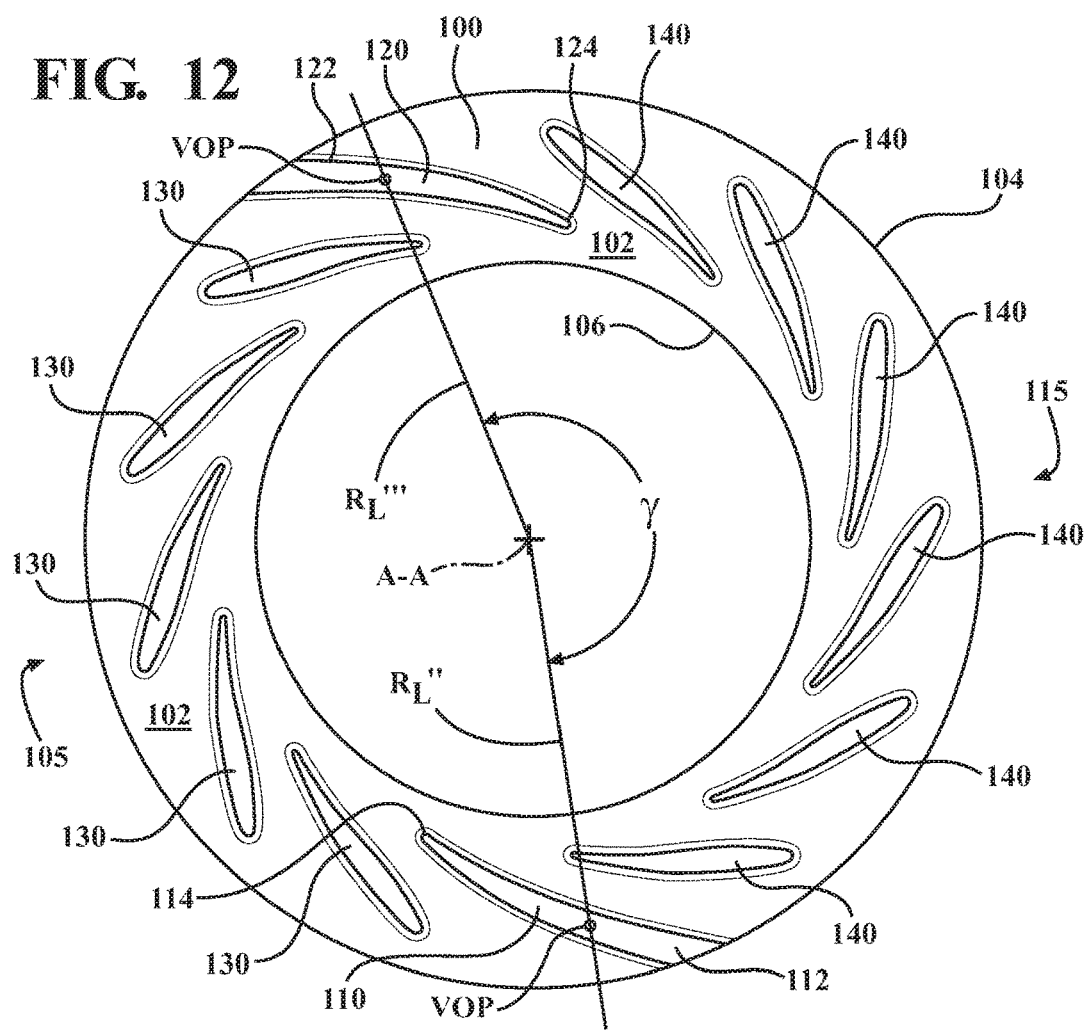
FIG. 12 is an end view of the vane ring of FIG. 2 illustrating a tongue clocking angle ($\gamma$) of the respective pair of tongue vanes contained on the vane ring.

The configuration (i.e., the pattern or relative positioning) of each respective vane of the first and second tongue vanes 110, 120 and the first and second set of vanes 130, 140 on the vane ring surface 102 of the vane ring 100 can be individually defined in terms of a vane orientation point (VOP), a vane angle (α), and a vane orientation radius (φ/2) as illustrated in FIGS. 8-10. Further, the configuration of each respective vane of the first and second tongue vanes 110, 120 and the first and second set of vanes 130, 140 can be defined based on a relationship amongst successively spaced vanes 110, 120, 130, 140 in terms of a vane spacing (β) as illustrated in FIG. 11. Even still further, the configuration of each respective vane of the first and second tongue vanes 110, 120 and the first and second set of vanes 130, 140 can be defined based on a relationship between the first and second tongue vanes 110 and 120 can also define a tongue clocking angle (γ) as illustrated in FIG. 12. The illustrations provided in FIGS. 8-11 illustrate a vane pattern for use with a turbine housing 36 for use in a turbine portion 33 having a turbine wheel 42 for rotating in the opposite rotational direction than provided in FIG. 12 (and also in FIGS. 2 and 13-15). However, the concepts for describing the vane orientation point (VOP), vane angle (α), vane orientation radius (φ/2), vane spacing (β), and tongue clocking angle (γ) are the same in both types of vane arrangements.

Referring now to FIGS. 8A and 8B, the vane orientation point (VOP) of an individual vane 110, 120, 130, 140 are illustrated (with the vanes 130, 140 illustrated in FIG. 8A, and the tongue vanes 110, 120 illustrated in FIG. 8B) and are defined as a distance "x" from the leading edge portion 112, 122, 132, 142 and along the mean line ML. The mean line ML (e.g., a mean chord line) is defined by a locus of points positioned between a leading edge portion 112, 122, 132, 142 and a trailing edge portion 114, 124, 134, 144 of the individual vane 110, 120, 130, 140 and respectively positioned halfway between the a first side and an opposing second side of individual vane 110, 120, 130, 140. The leading edge portions 112, 122, 132, 142 are used by convention herein, however the vane orientation point (VOP) of an individual vane 110, 120, 130, 140 could alternatively be defined as a distance "y" (not shown) from the trailing edge portion 114, 124, 134, 144 and along the mean line ML and arrive at the same vane orientation point (VOP). The vane orientation point (VOP) along each of the respective vanes 110, 120, 130, 140 is an arbitrary point, with the distance "x" defining the VOP located at a distance from about 20 to 45 percent of the total length of the mean chord line ML. Notably, however, while the location of the VOP is arbitrarily determined, the VOP's for each of the vanes 110, 120, 130 and 140 on any given vane ring 100 are positioned in the same relative location so that the vane angle (α), vane orientation radius (φ/2), vane spacing (β), and tongue clocking angle (γ) as described below can be determined.

As shown in FIG. 9, the vane angle (α) is illustrated and is defined as the angle made by a radial line RL extending from the axis of rotation A-A of the turbine wheel 42 through the vane orientation point (VOP) and the tangent line TL to the bottom of the respective vane 110, 120, 130, 140 (shown on representative vane 130 or 140 in FIG. 9). As an alternative, the tangent line TL could be defined by a straight chord line passing through a leading edge and trailing edge of the vane. The angle of the tangent line TL relative to the radial line RL is a function of relative radial distances of the leading edge portion 112, 122, 132, 142 (defined as a first radial distance) and the trailing edge portion 114, 124, 134, 144 (defined as a second radial distance) of a respective vane 110, 120, 130, 140. Typically, the first radial distance is equal to or greater than the second radial distance, with the vane angle (α) ranging from 90 degrees (when the first radial distance is equal to the second radial distance) to 0 degrees (when the first radial distance is maximized and the second radial distance is minimized such that the tangent line TL is coextensive with the radial line RL). As the vane angle (α) decreases from 90 degrees towards 0 degrees, the flow of exhaust gas from the volute 54, 56 to the turbine wheel 42 disrupted by the respective vane 110, 120, 130, 140 is correspondingly decreased.

As shown in FIG. 10, the vane orientation radius (φ/2) is illustrated and is defined as the length of the radial line RL extending from the axis of rotation of the turbine wheel 42 to the vane orientation point (VOP) of a particular respective vane 110, 120, 130, 140 (shown as representative vane 130 or 140 in FIG. 10).

As shown in FIG. 11, the vane spacing (β) (i.e., angular vane spacing (β)) is illustrated and is defined as the angle (β) between the respective radial lines RL, RL' of two successive vanes 110, 120, 130, 140 (shown on representative vane 130 or 140 in FIG. 11) spaced around the vane ring 100. In embodiments having equally spaced vanes (i.e., wherein the vane spacing (β) between each successive vane two successive vanes 110, 120, 130, 140 is constant), the vane spacing (β) in the vane ring 100 is found according to the calculation: 360 degrees/number of vanes. In vane ring 100 having thirteen vanes 110, 120, 130, 140, such as provided in FIGS. 2-7 and 13-15, the angular vane spacing is about 27.7 degrees between each respective vane (360 degrees/13 vanes). In embodiments having unequally spaced vanes, the mean angular spacing (i.e., the average spacing between all the vanes around the vane ring 100) can be calculated by the same equation.

As shown in FIG. 12, the tongue clocking angle (γ) is defined as the angle between the two respective radial lines RL", RL'" extending from the axis of rotation of the turbine wheel 42 to the vane orientation point (VOP) (shown in FIG. 8 as the angle (γ) between the first and second tongue vanes 110, 120.

The vane patterns of the vane ring 100 of FIGS. 2, 12 and 13 illustrate one asymmetric vane pattern on the vane ring 100 that includes equal vane spacing (β), equal vane orientation radii (φ/2), equal vane angles (α), unequal clocking ((γ) and (γ')) of the tongue vanes 110, 120, and complete volute separation at each of the first and second tongue vanes 110, 120.

In particular, FIG. 13 illustrates an embodiment of the vane ring 100 in which the first and second volutes 54, 56 are configured with first and second volute 54, 56 separation, with each volute 54, 56 having an identical respective (minimum) cross-sectional area (CA, CA', respectively, see FIG. 2) defined as the volute throat, just upstream of interface with the vane ring 100, alternatively referred to as identical critical throat areas at the interface with the vane ring 100 (the volutes 54, 56 and the corresponding critical throat areas at the interface with the vane ring 100 are shown in the corresponding FIG. 2). This identical critical throat area includes wherein the leading edge portion 112 of the first tongue vane 110 is circumferentially spaced 180 degrees around the outer circumferential edge 106 of the vane ring 100 relative to the leading edge portion 122 of the second tongue vane 120. In addition, the identical critical throat area also includes wherein a first tongue clocking angle (γ') between the first and second tongue vane 110, 120 corresponding to the first arcuate region 105 is less than 180 degrees, while a second tongue clocking angle (γ) between the first and second tongue vane 110, 120 corresponding to the second arcuate region 115 is greater than 180 degrees, with the total combined degrees of the first and second clocking angles (γ'+γ) equals 360 degrees.

To achieve the identical critical flow parameter, the runner length of the second volute 56 (defined along the spiral length of the second volute 56 from its outer end 56a (see FIG. 3) and its inner end 56b (see FIG. 2)) may differ from the corresponding runner length of the first volute 54 (defined along the spiral length of the first volute 54 from its outer end 54a (see FIG. 3) and its inner end 54b (see FIG. 2)).

As also illustrated in FIG. 13, the vane angle (α) of each of the respective vanes 110, 120, 130 and 140 is between 90 and 0 degrees, with each vane angle (α) being equal, with the first radial distance (corresponding to the respective leading edge portion 112, 122, 132, 142) being greater than the second radial distance corresponding to the respective trailing edge portion 114, 124, 134, 144) but wherein the first radial distance is not maximized. As illustrated, each of the equal vane angles (α) of the respective vanes 110, 120, 130 and 140 in FIGS. 2, 12 and 13 is between 30 and 60 degrees.

While not illustrated in FIG. 13, the vane orientation radii (φ/2) of each of the respective vanes 110, 120, 130 and 140 is the same, with each of the respective vane orientation points VOP of the respective vanes being located between the inner circumferential edge 104 and the outer circumferential edge 106, such as approximately midway between the inner circumferential edge 104 and the outer circumferential edge 106.

Still further, the vane spacing (β) of each of the respective thirteen vanes 110, 120, 130 and 140 in FIG. 13 (not shown) corresponds to an equiangular vane spacing angle (β) of about 27.7 degrees.

In this configuration, assuming generally equal pulses of exhaust gas being produced corresponding to an exhaust stroke of each of the first and second groups of cylinders 70, 72 (i.e., as defined herein, the term "generally equal" refers to an exhaust gas emission from each of the first and second groups of cylinders, with generally equal being defined as having an exhaust gas emission of the first group of cylinders 70 being within thirteen percent of the exhaust gas emission of the second group of cylinders 72 corresponding to each respective exhaust stroke), the first volute flow parameter 55 is different (such as larger or smaller) from the corresponding second volute flow parameter 57 by virtue of e.g. the difference in runner length and turning radius of the first volute 54 compared to the of the second volute 56, even though the critical throat areas are the same. Moreover, the corresponding first vane flow parameter 135 has a value lower than the corresponding second vane flow parameter 145 by virtue of the inclusion of one additional vane 140 in the second arcuate region 115 (i.e., FIG. 13 illustrates a vane ring 100 having six vanes 140 in the second arcuate region 115 and only five vanes 130 in the first arcuate region 105).

Accordingly, the first total flow parameter 165 is generally equal to the second total flow parameter 175 (i.e., there is generally equal exhaust flow from the first volute 54 through the vane ring 100 to the turbine blades 45 during a pulse of exhaust gas from the first group of cylinders 70 as from the second volute 56 through the vane ring 100 to the turbine blades 45 during a pulse of exhaust gas from the second group of cylinders 72). As defined herein, the term "generally equal" refers to a first total flow parameter value that is within thirteen percent of another total flow parameter value, and as defined in a dual volute turbocharger 32 as used herein wherein the values of the total first flow parameter 165 are within ten percent of the total second flow parameter 175, such as within ten percent, such as within seven percent, such as within five percent, such as within two percent. The "generally equal flow rates" of the first and second total flow parameters 165, 175 may also alternatively be referred to herein as "equalized flow" or an equivalent term. While the total flow parameters 165, 175 are generally equal as described above, the first total flow parameter 165 in the embodiment of FIGS. 2, 12 and 13 is slightly higher (i.e. has a value slightly larger) than the corresponding second total flow parameter 175, but with the allowable deviations of flow values described above (i.e., within thirteen percent). Stated another way, the value of the first total flow parameter 165 is within thirteen percent of the value of the second total flow parameter 175. To achieve the generally equal flow rates or equalized flow, when the first volute flow parameter 55 is larger than the second volute flow parameter 57, such as shown in FIG. 2, the second vane flow parameter 175 is larger than then first vane flow parameter 165.

However, in the embodiment of FIGS. 2, 12 and 13, while the equal vane spacing (β) and equal vane angles (α) of the respective vanes 110, 120, 130 and 140, alone or in combination with the equal vane orientation radii (φ/2), achieves the generally equalized flow as described above, the high degree of periodic cyclic pressure fluctuations that excite the turbine wheel 42 may increase the risk of high cycle fatigue (HCF) even where there is generally equalized flow.

Figure 15:
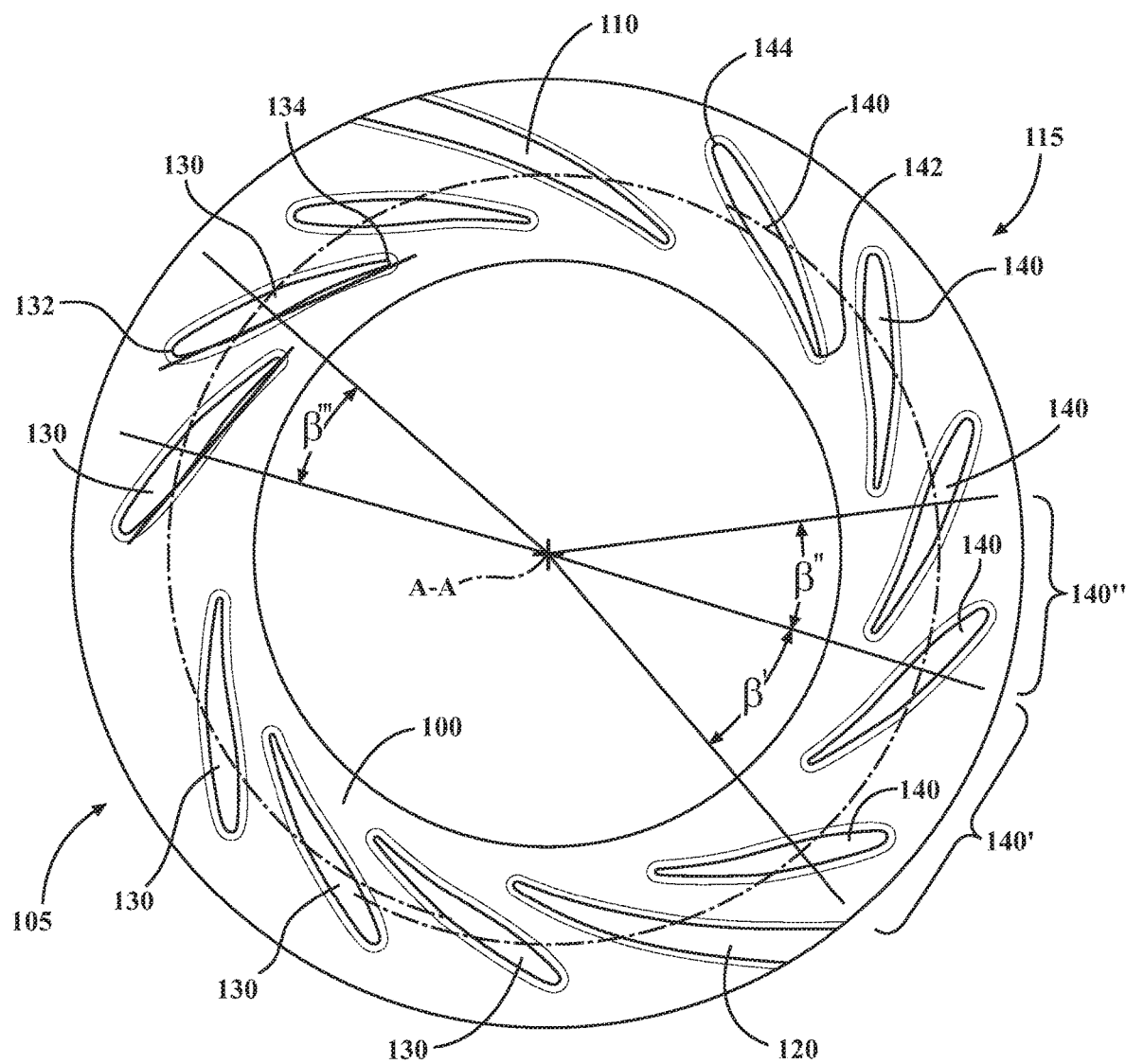
FIG. 15 is a perspective view of a vane ring having an alternative asymmetric vane pattern for use in the turbocharger of the system of FIGS. 1-7 in accordance with an embodiment of the present invention illustrating an asymmetric vane pattern with unequal vane spacing ($\beta$), unequal vane orientation radii ($\phi/2$), unequal vane angles ($\alpha$), and unequal tongue clocking angles ($\gamma$) and ($\gamma'$) of the respective pair of tongue vanes with volute separation at the tongue vanes but with equalized flow at single emission of each volute.

FIGS. 14 and 15 illustrate exemplary embodiments of the vane ring 100 for use in the turbocharger 32 of the present invention, in which the same number of vanes 110, 120, 130 and 140 are repositioned in different asymmetric patterns on the vane ring surface 102 of the vane ring 100 as compared to the embodiment of FIGS. 2, 12 and 13 so as to still provide generally equal flow symmetry (but in the embodiments of FIGS. 14 and 15 wherein the values of the total first flow parameter 165 are within ten percent of the total second flow parameter 175) as described above, but with reduced risk of HCF as compared with the embodiment of FIGS. 2, 12 and 13. Accordingly, in each of the exemplary embodiments of FIGS. 14 and 15, to achieve the generally equal flow rates or equalized flow when the first volute flow parameter 55 is larger than the second volute flow parameter 57, the second vane flow parameter 175 is configured with the asymmetric vane pattern so that it has a correspondingly larger value than the first vane flow parameter 165.

Referring now to FIG. 14, one exemplary embodiment of the vane ring 100 is provided with the first and second tongue vanes 110, 120 having the same first and second clocking angles (γ'+γ) and with complete volute 54, 56 separation at the tongue vanes 110, 120 and the same critical throat area as the vane ring 100 and with the same equal vane spacing (β) as provided in the vane ring 100 of FIGS. 2, 12 and 13. In this exemplary embodiment, however, each of the tongue vanes 110 and 120, as well as the second set of vanes 140, are provided with a different and increased vane angle (α') as compared with the first set of vanes 130 having the original vane angles (α) corresponding to the vane angle (α) in FIGS. 2, 12 and 13. The minimum difference in the respective vane angles (i.e., α'−α) may vary from greater than 0 degrees, such as greater than 0.1 degrees, such as greater than 1.0 degrees. Similarly, the maximum difference in the respective vane angles (i.e., $\alpha'-\alpha$) may vary from less than 90 degrees, such as less than 45 degrees. In particular, the difference in the respective vane angles (i.e., $\alpha'-\alpha$) is typically between 0.1 and 10 degrees, such as between 1 and 5 degrees, such greater than 0.1 and as less than or equal to 4 degrees.

In addition, each of the tongue vanes 110 and 120, as well as the second set of vanes 140, are provided with a decreased vane orientation radius ($\phi/2'$) as compared with the first set of vanes 130 having the original vane orientation radius ($\phi/2$) as provided the embodiment of the vane ring 100 of FIGS. 2, 12 and 13. The ratio of the respective vane orientation radius (i.e., $\phi/2$: $\phi/2'$) in the embodiment of FIG. 14 may vary from slightly greater than 1:1 to about 2:1, such as from 1.001 to 1.100, such as 1.025:1. Stated another way, the vane orientation radius ($\phi/2$) of the first set of vanes 130 is between one and two times greater than the vane orientation radius ($\phi/2'$) of each of the first and second tongue vanes 110, 120 and the second set of vanes 140.

The increased vane angle ($\alpha'$ vs. $\alpha$) and decreased vane orientation radius ($\phi/2'$ vs. $\phi/2$) of the tongue vanes 110, 120 and second set of vanes 140, as illustrated in FIG. 14, in combination with the unequal clocking of the vane tongues 110, 120 as also illustrated in FIG. 14, is expected to maintain the generally equal flow symmetry of the alternative vane ring 100 of FIG. 14 within the 10 percent value while reducing HCF forcing function as compared with the vane ring 100 of the embodiment of FIGS. 2, 12 and 13.

By way of example, wherein $\alpha'-\alpha \leq 4°$ and the vane orientation radius ratio (i.e., the $\phi/2$: $\phi/2'$ ratio) is 1.025, the calculated difference between the first total flow parameter 165 and the second total flow parameter 175 is less than seven percent, such as less than five percent.

While FIG. 14 illustrates a vane ring 100 with vanes 110, 120, 130, 140 having two different sets of vane orientation radii and two different sets of vane angles, the present invention contemplates wherein one or more of the vanes 110, 120, 130, 140 may have three or more different vane orientation radii and/or three or more different vane angles.

Referring now to FIG. 15, another exemplary embodiment of the vane ring 100 is provided with the same first and second clocking angles ($\gamma'+\gamma''$) and with complete volute 54, 56 separation at the tongue vanes 110, 120 and the same critical throat area as the vane ring 100 as provided in the vane ring of FIGS. 2, 12 and 13 and as also provided in FIG. 14. FIG. 15 also illustrates unequal vane angles ($\alpha$) and unequal vane orientation radius ($\phi/2$), but FIG. 15 is not labelled as such.

However, in this exemplary embodiment of FIG. 15, at least one respective adjacent pair of the vanes 110, 120, 130, 140 has a different vane spacing as compared with at least one additional respective pair of respective vanes 110, 120, 130, 140 having the original vane spacing ($\beta$) found in FIGS. 2, 12, 13 and 14 while maintaining the desired first and second vane flow parameters 135, 145 to achieve generally equal flow to the turbine wheel 42 as described above.

In particular, as illustrated and labelled in FIG. 15, one adjacent pair 140' of the second set of vanes 140 of the second arcuate region 115 is illustrated as having an increased vane spacing ($\beta'$) as compared with an adjacent pair 130' of the first set of vanes 130 having the original and equal vane spacing ($\beta$) in the first arcuate region 105 as provided in FIGS. 2, 12, 13 and 14. To accommodate this increased vane spacing ($\beta'$) of the adjacent pair 140' of the second set of vanes 140, while maintaining the total number of vanes 110, 120, 130, 140 of the vane ring 100 at the same number, it necessarily follows that at least one other adjacent pair (shown in FIG. 15 as one other adjacent pair 140'' of the second set of vanes 140) of vanes 110, 120, 140 along the same arcuate region 115 must have a decreased vane spacing ($\beta''$) so as to maintain the desired second vane flow parameter 145, and hence maintain the second total flow parameter 175, to maintain generally equal flow to the turbine wheel 42 as described above in the embodiments of FIGS. 2, 12, 13 and 14. Still further, FIG. 15 also illustrates wherein at least one additional pair of vanes (shown in FIG. 15 as an adjacent pair of the first set of vanes 130) has a different vane spacing ($\beta'''$) from the two adjacent pairs 140', 140'' illustrate, with the different vane spacing ($\beta'''$) having one of a mean angular vane spacing ($\beta$), an increased angular vane spacing ($\beta'$), or a decreased angular vane spacing ($\beta''$).

While not labelled in FIG. 15, the present invention also contemplates varying the vane spacing on the opposing first arcuate path 105. In particular, the vane spacing between any two adjacent vanes of the first set of vanes 130, or between a vane 130 and one or the other of the tongue vanes 110, 120, may also be provided with varied spacing similar to the varied spacing of the two adjacent pairs of vanes 140' and 140''.

While not illustrated in FIG. 15, in further exemplary embodiments, each of the tongue vanes 110 and 120, as well as the second set of vanes 140, may be provided with the same decreased vane orientation radius ($\phi/2'$) as the corresponding vanes 110, 120 and 130 in FIG. 14. In addition, each of the tongue vanes 110 and 120, as well as the second set of vanes 140, are provided with same increased vane angle ($\alpha'$) as compared with the first set of vanes 130 having the original vane angles ($\alpha$) as provided in FIG. 14.

The varied vane spacing ($\beta$, $\beta'$, $\beta''$, $\beta'''$) of the vanes 110, 120, 130, 140 along at least one of the first and second arcuate regions 105, 115) as illustrated in FIG. 15, alone or in combination with the increased vane angle ($\alpha'$) and decreased vane orientation radius ($\phi/2'$) as provided in the alternative embodiment of FIG. 14, and also in combination with the unequal clocking of the vane tongues 110, 120 as also provided in FIG. 15, is also expected to reduce the HCF forcing function while maintaining the generally equal flow symmetry as compared with the embodiment of FIGS. 2, 12 and 13.

In particular, the introduction of unequal and varied vane spacing to create asymmetric vane spacing pattern, as exemplified the exemplary embodiment of FIG. 15, can reduce HCF force function reduction in systems having a vane pattern with equal vane spacing and achieve between an 8 and 51% reduction in turbine wheel forced response (dynamic stress associated with various modes and orders) while maintaining a generally equal flow symmetry of less than seven percent (i.e., wherein the values of the first and second total flow parameters 165, 175 are within seven percent of one another) based on analytic assessment.

In certain embodiments including unequal vane spacing, as exemplified the exemplary embodiment of FIG. 15, the total number (n) of adjacent pairs of vanes having vane spacing ($\beta'$) greater than the mean average vane spacing ($\beta$) is no more than one-half the number of adjacent pairs of vanes having vane spacing ($\beta''$) less than the mean average vane spacing ($\beta$), and wherein a standard deviation of the vane spacings ($\beta'$, $\beta''$, $\beta'''$) from the mean angular spacing ($\beta$) is in the range of 0.1 to 6. The mean vane angular spacing is defined as 360 degrees divided by m, wherein m is a sum of the total number of vanes on the vane ring (i.e., the sum of the first tongue vane 110, the second tongue vane 120, a number of vanes of the first set of vanes 130, and a number of vanes of the second set of vanes 140, totaling thirteen vanes as in FIG. 15). The value n is also defined by the equation (4n±1)=m.

While one particular unequal vane spacing of the vanes 110, 120, 130, 140 having varied vane spacing (β, β', β") is illustrated in FIG. 15, the present invention also contemplates varying the vane spacing of the adjacent pairs of the vanes 110, 120, 130, 140 in many other alternative manners to provide the desired first and second vane flow parameters 135, 145 respectively while maintaining generally equal flow as detailed above. Such variation of the vane spacing of adjacent pairs of vanes 110, 120, 130, 140 may be in a completely random pattern, or a grouped pattern with multiple spacing angles, or in any cyclic but not symmetric spacing pattern. In certain embodiments, none of the adjacent pairs of vanes 110, 120, 130, 140 have the same vane spacing as any other adjacent pair of vanes 110, 120, 130, 140, while in other embodiments two or more pairs of vanes may have the same vane spacing. Still further, in certain embodiments, none of the adjacent pairs of vanes 110, 120, 130, 140 have the mean angular spacing (β) found in the equally spaced embodiment such as in FIGS. 2, 12 and 13.

Referring back to FIG. 1, in certain embodiments, the system 30 also includes a controller 146 that is coupled to turbocharger 32 and/or to the internal combustion engine 34 that controls the various other components of the turbocharger 32 and/or internal combustion engine 34. The controller 146 may include one or more processors, or microprocessors, for processing instructions stored in memory 150 to control various functions on the turbocharger 32 related to the introduction of the exhaust gas within the turbine housing interior 40 through the first and second volutes 54, 56. Such instructions may be any of the functions, algorithms or techniques described herein performed by the controller 146. Additionally, or alternatively, the controller 146 may include one or more microcontrollers, field programmable gate arrays, systems on a chip, discrete circuitry, and/or other suitable hardware, software, or firmware that is capable of carrying out the functions described herein. In some embodiments, the controller 146 is an engine control unit (ECU) that controls the various other components of the turbocharger 32 and/or internal combustion engine 34. In embodiments where the controller 146 is the engine control unit, the controller 146 is separate from the turbocharger 32. In other words, the controller 146 is a separate component that is not included on or in the turbocharger 32. In other embodiments, the controller 146 is discrete from the ECU. For example, the controller 146 may be included on or in the turbocharger 32. In other words, the controller 146 is a component included on or in the turbocharger 32. With reference to FIG. 1, the system 30 may include the turbocharger 32, the internal combustion engine 34, and the controller 146. Typically, the system 30 also includes at least one sensor 148.

While the embodiments illustrated include the use of the vane ring 100 having an asymmetric vane pattern in accordance with the present invention in the turbocharger 32 having a dual volute turbine housing 36, the present invention is not limited to the arrangement provided. For example, the vane ring 100 may be included in a single volute turbine housing, or in a divided volute housing having more than two volutes, and still provide the benefit of generally equal flow symmetry and reduced HCF in the same manner as with a dual volute turbine housing 32. Still further, while the vane ring 100 as illustrated includes thirteen total vanes, the total number of vanes may be varied from thirteen to any other total odd number of vanes to maintain the asymmetry of the vane pattern and may include a varying number of tongue vanes 110, 120 than the two provided.

Even further, other asymmetric vane patterns capable of achieving the benefit of generally equal flow symmetry and reduced HCF in the entryway system 30 are also contemplated. For example, in certain other embodiments, the vane angle (α) of the first set of vanes 130 is different than the vane angle (α) of the second set of vanes 140. In conjunction therewith, further exemplary embodiments include wherein the leading edges 134 (or the vane orientation points) of the first set of vanes 130 are positioned at a first radial distance from a centerline of rotation of the turbine wheel 42, and wherein leading edges 144 (or the vane orientation points) of the second set of vanes 140 are positioned at a second, different, radial distance from the centerline of rotation of the turbine wheel 42. Alternatively, adjacent vanes 130' of the first set of vanes 130 may be set a first circumferential distance from one another, while adjacent vanes 140' of the second set of vanes 140 may be set a second, different, circumferential distance from one another.

Even still further, yet other asymmetric vane patterns capable of achieving the benefit of generally equal flow symmetry and reduced HCF in the entryway system 30 are contemplated. For example, one or both of the respective first and/or the second set of vanes 130, 140 may include at least three vanes, such as four or more vanes, and wherein the circumferential distance between any two adjacent of such vanes 130', 140' of the respective first or second set of vanes 130, 140 may be different or the same. In an embodiment wherein the first set of vanes 130 includes at least three vanes, a first circumferential distance between a first one of the first set of vanes 130 and a second one of the first set of vanes 130 is different than a second circumferential distance between the second one of the first set of vanes 130 and a third one of the first set of vanes 130. In a further embodiment wherein the first set of vanes 130 includes a fourth vane, a third circumferential distance between the fourth one of the first set of vanes 130 and the third one of the first set of vanes 130 is equal to the first circumferential distance or the second circumferential distance.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. An entryway system comprising:
   a divided volute turbocharger for receiving exhaust gas from an internal combustion engine and for delivering compressed air to the internal combustion engine, the internal combustion engine including a first group of cylinders and a second group of cylinders, with the relative pulse of exhaust gas delivered from the first and second group of cylinders being generally equal for each exhaust stroke, said divided volute turbocharger comprising:
      a turbine housing comprising a turbine housing interior adapted to receive a turbine wheel having a plurality of equally spaced turbine blades,
      a first volute adapted for fluid communication with the internal combustion engine and said turbine housing interior for delivering exhaust gas from the first group of cylinders to said turbine housing interior,
      a second volute adapted for fluid communication with the internal combustion engine and said turbine housing interior for delivering exhaust gas from the second group of cylinders to said turbine housing interior independently of said first volute, a turbine housing outlet in fluid communication with said turbine housing interior, and a wall separating said first volute from said second volute and including a first tongue and a second tongue spaced from said first tongue; and a vane ring disposed in said turbine housing interior between said first and second volutes and around said turbine wheel, said vane ring comprising an annular disk including a vane ring surface disposed between an inner circumferential ring and an outer circumferential ring with said inner circumferential ring defining an orifice for receiving said turbine wheel, said vane ring surface including a plurality of vanes having an asymmetric vane pattern and comprising:

a first tongue vane having a leading edge extending along said vane ring surface to said outer circumferential ring and aligned with said first tongue, a second tongue vane spaced around said vane ring relative to said first tongue vane, said second tongue vane having a leading edge extending along said vane ring surface to said outer circumferential ring and aligned with said second tongue, with said first and second tongue vanes dividing said vane ring surface into a first arcuate region and a second arcuate region, a first set of vanes disposed in a spaced apart manner along said first arcuate region of said vane ring surface and positioned downstream from said first volute, and a second set of vanes disposed in a spaced apart manner along said second arcuate region of said vane ring surface and positioned downstream from said second volute, with said second set of vanes disposed differently than said first set of vanes to define said asymmetric vane pattern;

wherein said first set of vanes defines a first vane flow parameter in an area located between said first arcuate region and an interior surface of said turbine housing downstream of said first volute for receiving the relative pulse of exhaust gas from said first volute corresponding to an exhaust stroke of the first group of cylinders;

wherein said second set of vanes defines a second vane flow parameter in an area located between said second arcuate region and said interior surface of said turbine housing downstream of said second volute for receiving the relative pulse of exhaust gas from said second volute corresponding to an exhaust stroke of the second group of cylinders;

wherein said first volute defines a first volute flow parameter for the relative pulse of exhaust gas received from the first group of cylinders;

wherein said second volute defines a second volute flow parameter for the relative pulse of exhaust gas received from the second group of cylinders;

wherein said first volute flow parameter in series combination with said first vane flow parameter defines a first total flow parameter, and wherein said second volute flow parameter in series combination with said second vane flow parameter defines a second total flow parameter; and wherein the value of said first total flow parameter is generally equal to the value of said second total flow parameter or wherein the value of said first total flow parameter is within thirteen percent of the value of said second total flow parameter.

2. The entryway system of claim 1, wherein the value of said first total flow parameter is within thirteen percent of the value of said second total flow parameter.

3. The entryway system of claim 1, wherein the value of said first and second volute flow parameter are each individually determined according to the equation:

$$\delta = (m\sqrt{T})/P,$$

wherein $\delta$ is the first or second volute flow parameter, m is a mass flow of the exhaust gas through a respective one of said first and second volute, T is an exhaust gas temperature at an inlet of said respective one of said first and second volute, and P is an exhaust gas pressure at said inlet of said respective one of said first and second volute.

4. An entryway system comprising:

a divided volute turbocharger for receiving exhaust gas from an internal combustion engine and for delivering compressed air to the internal combustion engine, the internal combustion engine including a first group of cylinders and a second group of cylinders, with the relative pulse of exhaust gas delivered from the first and second group of cylinders being generally equal for each exhaust stroke, said divided volute turbocharger comprising:

a turbine housing comprising a turbine housing interior adapted to receive a turbine wheel having a plurality of equally spaced turbine blades, a first volute adapted for fluid communication with the internal combustion engine and said turbine housing interior for delivering exhaust gas from the first group of cylinders to said turbine housing interior, a second volute adapted for fluid communication with the internal combustion engine and said turbine housing interior for delivering exhaust gas from the second group of cylinders to said turbine housing interior independently of said first volute, a turbine housing outlet in fluid communication with said turbine housing interior, and a wall separating said first volute from said second volute and including a first tongue and a second tongue spaced from said first tongue; and a vane ring disposed in said turbine housing interior between said first and second volutes and around said turbine wheel, said vane ring comprising an annular disk including a vane ring surface disposed between an inner circumferential ring and an outer circumferential ring with said inner circumferential ring defining an orifice for receiving said turbine wheel, said vane ring surface including a plurality of vanes having an asymmetric vane pattern and comprising:

a first tongue vane having a leading edge extending along said vane ring surface to said outer circumferential ring and aligned with said first tongue, a second tongue vane spaced around said vane ring relative to said first tongue vane, said second tongue vane having a leading edge extending along said vane ring surface to said outer circumferential ring and aligned with said second tongue, with said first and second tongue vanes dividing said vane ring surface into a first arcuate region and a second arcuate region, a first set of vanes disposed in a spaced apart manner along said first arcuate region of said vane ring surface and positioned downstream from said first volute, and a second set of vanes disposed in a spaced apart manner along said second arcuate region of said vane ring surface and positioned downstream from said second volute, with said second set of vanes disposed differently than said first set of vanes to define said asymmetric vane pattern;

wherein a relative positioning of each of said first and second tongue vanes, and each vane of said first and second set of vanes, respectively defines a vane orientation point (VOP), a vane angle ($\alpha$) and a vane orientation radius ($\phi/2$);

wherein said vane orientation point (VOP) is defined as a point located at a distance from about 20 to 45 percent of the total length of the mean chord line ML of a respective vane of said first and second tongue vanes or a respective one vane of said first and second set of vanes;

wherein said vane angle ($\alpha$) is defined as the angle made by a radial line extending from the axis of rotation of the turbine wheel through said vane orientation point (VOP) and a tangent line TL to the bottom of said respective vane of said first and second tongue vanes or a respective one vane of said first and second set of vanes;

wherein said vane orientation radius ($\phi/2$) is defined as the length of the radial line RL extending from the axis of rotation of said turbine wheel to said vane orientation point (VOP) of said respective vane of said first and second tongue vanes or a respective one vane of said first and second set of vanes; and wherein said vane angle ($\alpha$) and said vane orientation radius ($\phi/2$) of said first set of vanes differs from said vane angle ($\alpha$) and said vane orientation radius ($\phi/2$) of each of said first and second tongue vanes and said second set of vanes.

5. The entryway system of claim 4, wherein said vane angle of said first set of vanes is less than said vane angle of each of said first and second tongue vanes and said second set of vanes, and wherein said vane orientation radius ($\phi/2$) of said first set of vanes is greater than said vane orientation radius ($\phi/2$) of each of said first and second tongue vanes and said second set of vanes.

6. The entryway system of claim 5, wherein the difference between said vane angle ($\alpha$) of said first set of vanes and each of said first and second tongue vanes and said second set of vanes is greater than 0 degrees and less than 45 degrees.

7. The entryway system of claim 5, wherein said vane orientation radius ($\phi/2$) of said first set of vanes is between one and two times greater than said vane orientation radius ($\phi/2$) of each of said first and second tongue vanes and said second set of vanes.

8. The entryway system of claim 4, wherein a relationship between a successive pair of vanes of said plurality of vanes defines a vane spacing ($\beta$), and wherein at least one respective pair of vanes of said plurality of vanes has a different vane spacing ($\beta$) than another respective pair of vanes of said plurality of vanes.

9. The entryway system of claim 4, wherein a relationship between said first and second tongue vanes defines a first tongue clocking angle ($\gamma$) and a second tongue clocking angle ($\gamma'$), with the sum of the first and second tongue clocking angle (($\gamma$)+($\gamma'$)) totaling 360 degrees; and wherein each of said first and second clocking angles are respectively defined as an angle between two respective radial lines extending from an axis of rotation of said vane orientation point (VOP) between said first and second tongue vanes; and wherein said first tongue clocking angle corresponds to said first arcuate region and measures less than or equal to 180 degrees and wherein said second tongue clocking angle corresponds to said second arcuate region and measures greater than or equal to 180 degrees.

10. The entryway system of claim 8, wherein a relationship between said first and second tongue vanes defines a first tongue clocking angle ($\gamma$) and a second tongue clocking angle ($\gamma'$), with the sum of the first and second tongue clocking angle (($\gamma$)+($\gamma'$)) totaling 360 degrees; and wherein each of said first and second clocking angles are respectively defined as an angle between two respective radial lines extending from an axis of rotation of said vane orientation point (VOP) between said first and second tongue vanes; and wherein said first tongue clocking angle corresponds to said first arcuate region and measures less than or equal to 180 degrees and wherein said second tongue clocking angle corresponds to said second arcuate region and measures greater than or equal to 180 degrees.

11. The entryway system of claim 10 having between an 8 and 51% reduction in turbine wheel forced response as compared with an entryway system wherein each successive pair of vanes of said plurality of vanes defines an equal vane spacing.

12. The entryway system of claim 8, wherein a total number of adjacent pairs of said plurality of vanes having a vane spacing ($\beta$) greater than a mean average vane spacing is no more than one-half a total number of adjacent pairs of said plurality of vanes having a vane spacing ($\beta$) less than said mean average vane spacing, and wherein a standard deviation of said vane spacings from said mean angular spacing is in a range of 0.1 to 6.

13. A vane ring for use in an entryway system including a divided volute turbocharger for receiving exhaust gas from an internal combustion engine and for delivering compressed air to the internal combustion engine, the turbocharger including a turbine housing having a turbine housing interior adapted to receive a turbine wheel having a plurality of equally spaced turbine blades, a first volute and a second volute each adapted for independent fluid communication with the internal combustion engine and the turbine housing interior for delivering exhaust gas to the turbine housing interior, a turbine housing outlet in fluid communication with the turbine housing interior for discharging exhaust gas from the turbine housing interior, and a wall separating the first and second volute and including a first tongue and a second tongue, wherein said vane ring comprises:

an annular disk including a vane ring surface disposed between an inner circumferential ring and an outer circumferential ring with said inner circumferential ring defining an orifice for receiving the turbine wheel, said vane ring surface including a plurality of vanes having an asymmetric vane pattern and comprising:

a first tongue vane having a leading edge extending along said vane ring surface to said outer circumferential ring and is configured for alignment with the first tongue, a second tongue vane spaced around said vane ring relative to said first tongue vane, said second tongue vane having a leading edge extending along said vane ring surface to said outer circumferential ring and is configured for alignment with the second tongue, with said first and second tongue vanes dividing said vane ring surface into a first arcuate region and a second arcuate region,
  a first set of vanes disposed in a spaced apart manner along said first arcuate region of said vane ring surface and positioned downstream from said first volute, and
  a second set of vanes disposed in a spaced apart manner along said second arcuate region of said vane ring surface and positioned downstream from said second volute, with said second set of vanes disposed differently than said first set of vanes to define said asymmetric vane pattern;
wherein a relative positioning of each of said first and second tongue vanes, and each vane of said first and second set of vanes, respectively defines a vane orientation point (VOP), a vane angle (α) and a vane orientation radius (φ/2);
wherein said vane orientation point (VOP) is defined as a point located at a distance from about 20 to 45 percent of the total length of the mean chord line ML of a respective vane of said first and second tongue vanes or a respective one vane of said first and second set of vanes;
wherein said vane angle (α) is defined as the angle made by a radial line extending from the axis of rotation of the turbine wheel through said vane orientation point (VOP) and a tangent line TL to the bottom of said respective vane of said first and second tongue vanes or a respective one vane of said first and second set of vanes;
wherein said vane orientation radius (φ/2) is defined as the length of the radial line RL extending from the axis of rotation of said turbine wheel to said vane orientation point (VOP) of said respective vane of said first and second tongue vanes or a respective one vane of said first and second set of vanes; and
wherein said vane angle (α) and said vane orientation radius (φ/2) of said first set of vanes differs from said vane angle (α) and said vane orientation radius (φ/2) of each of said first and second tongue vanes and said second set of vanes.

14. The vane ring of claim 13, wherein said vane angle (α) of said first set of vanes is less than said vane angle (α) of each of said first and second tongue vanes and said second set of vanes, and wherein said vane orientation radius (φ/2) of said first set of vanes is greater than said vane orientation radius (φ/2) of each of said first and second tongue vanes and said second set of vanes.

15. The vane ring of claim 14, wherein the difference between said vane angle (α) of said first set of vanes and each of said first and second tongue vanes and said second set of vanes is greater than 0 degrees and less than 45 degrees.

16. The vane ring of claim 14, wherein said vane orientation radius (φ/2) of said first set of vanes is between one and two times greater than said vane orientation radius (φ/2) of each of said first and second tongue vanes and said second set of vanes.

17. The vane ring of claim 13, wherein a relationship between a successive pair of vanes of said plurality of vanes defines a vane spacing (β), and wherein at least one respective pair of vanes of said plurality of vanes has a different vane spacing (β) than another respective pair of vanes of said plurality of vanes.

18. The vane ring of claim 14, wherein a relationship between a successive pair of vanes of said plurality of vanes defines a vane spacing (β), and wherein at least one respective pair of vanes of said plurality of vanes has a different vane spacing (β) than at least one other respective pair of vanes of said plurality of vanes.

19. The vane ring of claim 13, wherein a relationship between said first and second tongue vanes defines a first tongue clocking angle (γ) and a second tongue clocking angle (γ'), with the sum of the first and second tongue clocking angle ((γ)+(γ')) totaling 360 degrees; and
  wherein each of said first and second clocking angles are respectively defined as an angle between two respective radial lines extending from an axis of rotation of said vane orientation point (VOP) between said first and second tongue vanes; and
  wherein said first clocking angle corresponds to said first arcuate region and measures less than or equal to 180 degrees and wherein said second clocking angle corresponds to said second arcuate region and measures greater than or equal to 180 degrees.

20. The vane ring of claim 14, wherein a relationship between said first and second tongue vanes defines a first tongue clocking angle (γ) and a second tongue clocking angle (γ'), with the sum of the first and second tongue clocking angle ((γ)+(γ')) totaling 360 degrees; and
  wherein each of said first and second clocking angles are respectively defined as an angle between two respective radial lines extending from an axis of rotation of said vane orientation point (VOP) between said first and second tongue vanes; and
  wherein said first clocking angle (γ) corresponds to said first arcuate region and measures less than or equal to 180 degrees and wherein said second clocking angle (γ') corresponds to said second arcuate region and measures greater than or equal to 180 degrees.

21. The vane ring of claim 17, wherein a relationship between said first and second tongue vanes defines a first tongue clocking angle (γ) and a second tongue clocking angle (γ'), with the sum of the first and second tongue clocking angle ((γ)+(γ')) totaling 360 degrees; and
  wherein each of said first and second clocking angles are respectively defined as an angle between two respective radial lines extending from an axis of rotation of said vane orientation point (VOP) between said first and second tongue vanes; and
  wherein said first clocking angle corresponds to said first arcuate region and measures less than or equal to 180 degrees and wherein said second clocking angle corresponds to said second arcuate region and measures greater than or equal to 180 degrees.

22. The vane ring of claim 18, wherein a relationship between said first and second tongue vanes defines a first tongue clocking angle (γ) and a second tongue clocking angle (γ'), with the sum of the first and second tongue clocking angle ((γ)+(γ')) totaling 360 degrees; and
  wherein each of said first and second clocking angles are respectively defined as an angle between two respective radial lines extending from an axis of rotation of said vane orientation point (VOP) between said first and second tongue vanes; and
  wherein said first clocking angle corresponds to said first arcuate region and measures less than or equal to 180 degrees and wherein said second clocking angle corresponds to said second arcuate region and measures greater than or equal to 180 degrees.

23. The vane ring of claim 18, wherein a total number of adjacent pairs of said plurality of vanes having a vane spacing ($\beta$) greater than a mean average vane spacing is no more than one-half a total number of adjacent pairs of said plurality of vanes having a vane spacing ($\beta$) less than said mean average vane spacing, and wherein a standard deviation of said vane spacings from said mean angular spacing is in a range of 0.1 to 6.

* * * * *